US012639477B2

(12) United States Patent
Lee et al.

(10) Patent No.: US 12,639,477 B2
(45) Date of Patent: May 26, 2026

(54) STORAGE DEVICE INCLUDING PROTECTED AREA AND DATA WRITE METHOD THEREOF

(71) Applicant: SAMSUNG ELECTRONICS CO., LTD., Suwon-si (KR)

(72) Inventors: Myeongjong Lee, Suwon-si (KR); Seongchan Jo, Suwon-si (KR); Jisoo Kim, Suwon-si (KR); Hyungsup Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 18/390,736

(22) Filed: Dec. 20, 2023

(65) Prior Publication Data

US 2024/0354448 A1      Oct. 24, 2024

(30) Foreign Application Priority Data

Apr. 18, 2023     (KR) ........................ 10-2023-0050806

(51) Int. Cl.
| | |
|---|---|
| *G06F 21/78* | (2013.01) |
| *G06F 3/06* | (2006.01) |
| *G06F 21/60* | (2013.01) |
| *G06F 21/64* | (2013.01) |

(52) U.S. Cl.
CPC ........... *G06F 21/78* (2013.01); *G06F 3/0622* (2013.01); *G06F 21/602* (2013.01); *G06F 21/64* (2013.01)

(58) Field of Classification Search
CPC ........... G06F 3/062–0622; G06F 21/57; G06F 21/6218–6281; G06F 21/64; G06F 21/78–805
See application file for complete search history.

(56) References Cited

U.S. PATENT DOCUMENTS

| | | | |
|---|---|---|---|
| 8,095,792 B2 | 1/2012 | Vanstone et al. | |
| 11,074,333 B2 | 7/2021 | Eisen et al. | |
| 11,088,845 B2 | 8/2021 | Sela et al. | |

(Continued)

FOREIGN PATENT DOCUMENTS

KR     10-2017-0084467          7/2017

OTHER PUBLICATIONS

Extended European Search Report in European Appln. No. 24166230. 3, mailed on Sep. 12, 2024, 6 pages.

(Continued)

*Primary Examiner* — Kevin Bechtel
(74) *Attorney, Agent, or Firm* — Fish & Richardson P.C.

(57) ABSTRACT
A method of writing data in a replay protected memory block (RPMB) area of a storage device in response to a request of a host device includes receiving a write request, including a message authentication code, data, and a bitmap index, from the host device and verifying the write request based on the message authentication code and the bitmap index. The verifying the write request may include calculating a message authentication code based on data and a bitmap index received from the host device, comparing a message authentication code, calculated in the storage device, with the message authentication code of the write request, and comparing the bitmap index of the write request with bitmap indexes, stored in the storage device, to check whether a replay attack has been made.

20 Claims, 43 Drawing Sheets

(56)     References Cited

U.S. PATENT DOCUMENTS

| | | | |
|---|---|---|---|
| 11,120,167 B2 | 9/2021 | Mondello et al. | |
| 2011/0154059 A1 | 6/2011 | Durham et al. | |
| 2017/0199676 A1 | 7/2017 | Choi | |
| 2019/0238312 A1 | 8/2019 | Dickens, III et al. | |
| 2020/0014544 A1* | 1/2020 | Sela | G06F 21/79 |
| 2021/0273924 A1 | 9/2021 | Mondello et al. | |
| 2022/0091757 A1 | 3/2022 | Lee | |
| 2022/0091760 A1 | 3/2022 | Lee | |
| 2022/0413718 A1* | 12/2022 | Lee | G06F 3/0679 |
| 2023/0289071 A1* | 9/2023 | Jang | G06F 3/0659 |

OTHER PUBLICATIONS

Reddy et al., "Mobile secure data protection using eMMC RPMB partition," 2015 Intl. Conference on Computing and Network Communications (CoCONet '15), Dec. 16-19, 2015, pp. 946-950.

* cited by examiner

FIG.9A
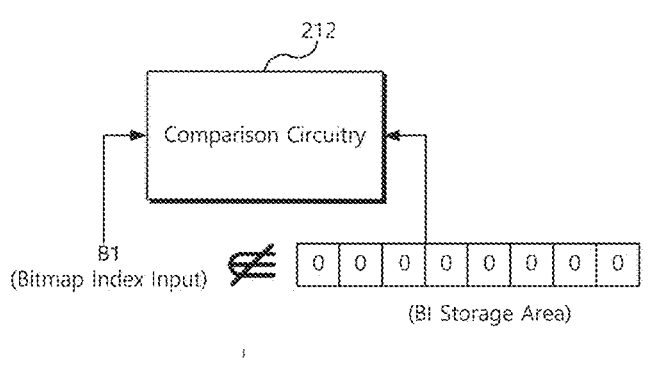
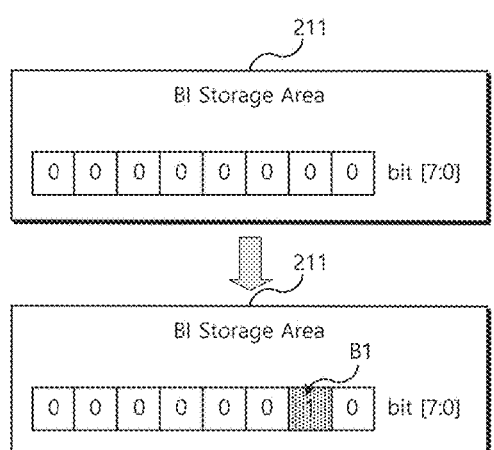
FIG.9B
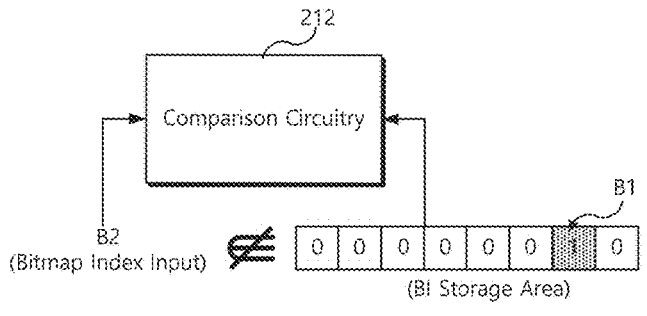
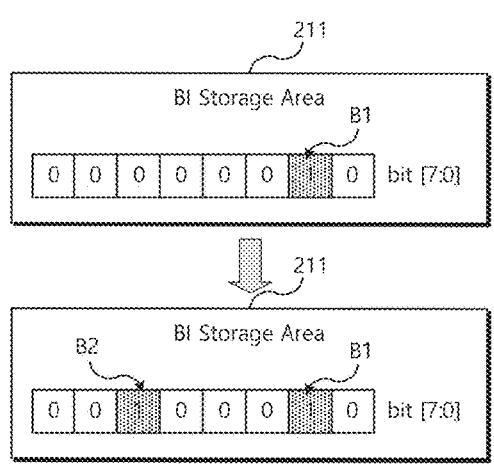

FIG.9C
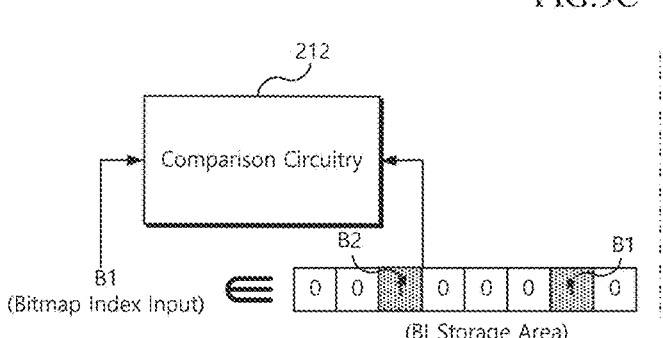
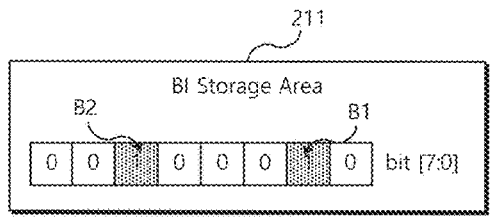

FIG.11

| Offset | Field Name |
|--------|------------|
| 0:189 | Stuff bytes |
| 190:191 | Bitmap Support |
| 192:195 | Bitmap Index |
| 196:227 | MAC / Key |
| 228:483 | Data |
| 484:499 | Nonce |
| 500:503 | Write Counter |
| 504:505 | Address |
| 506:507 | Block Count |
| 508:509 | Result |
| 510:511 | Req./Resp. |

[RPMB Message Data Frame]

FIG.12A

| Offset | Field Name | Value |
|--------|-----------|-------|
| 0:189 | Stuff bytes | 0...00h |
| 190:191 | Bitmap Support | Using Bitmap Index Flag |
| 192:195 | Bitmap Index | Index from the Host |
| 196:227 | MAC / Key | MAC from the Host |
| 228:483 | Data | Data |
| 484:499 | Nonce | Nonce from the host |
| 500:503 | Write Counter | Current Counter value |
| 504:505 | Address | Address |
| 506:507 | Block Count | Number of 256B blocks |
| 508:509 | Result | 0000h |
| 510:511 | Req./Resp. | 0003h |

[REQ(Authenticated Data Write Request)]

FIG.12B

| Offset | Field Name | Value |
|---|---|---|
| 0:189 | Stuff bytes | 0...00h |
| 190:191 | Bitmap Support | Using Bitmap Index Flag |
| 192:195 | Bitmap Index | Index from the Host |
| 196:227 | MAC / Key | MAC from the Device |
| 228:483 | Data | 0...00h |
| 484:499 | Nonce | Copy of the Nonce |
| 500:503 | Write Counter | New Counter value |
| 504:505 | Address | Address |
| 506:507 | Block Count | 0000h |
| 508:509 | Result | Result code |
| 510:511 | Req./Resp. | 0300h |

[RES(Result Read Response)]

FIG.13A

| Offset | Field Name | Value |
|--------|-----------|-------|
| 0:189 | Stuff bytes | 0...00h |
| 190:191 | Bitmap Support | Using Bitmap Index Flag |
| 192:195 | Bitmap Index | Index from the Host |
| 196:227 | MAC / Key | MAC from the Host |
| 228:483 | Data | LUN, DATA LENGTH, Secure Write Protect Entries |
| 484:499 | Nonce | Nonce from the host |
| 500:503 | Write Counter | Current Counter value |
| 504:505 | Address | 0000h |
| 506:507 | Block Count | 0001h |
| 508:509 | Result | 0000h |
| 510:511 | Req./Resp. | 0006h |

[REQ(Secure Write Protect Configuration Block Write Request)]

FIG.13B

| Offset | Field Name | Value |
|---|---|---|
| 0:189 | Stuff bytes | 0...00h |
| 190:191 | Bitmap Support | Using Bitmap Index Flag |
| 192:195 | Bitmap Index | Index from the Host |
| 196:227 | MAC / Key | MAC from the Device |
| 228:483 | Data | 0...00h |
| 484:499 | Nonce | Copy of the Nonce |
| 500:503 | Write Counter | New Counter value |
| 504:505 | Address | 0000h |
| 506:507 | Block Count | 0000h |
| 508:509 | Result | Result code |
| 510:511 | Req./Resp. | 0600h |

[RES(Result Read Response)]

Host Device 100

Storage Device 200

CMD UPIU
(with EHS field)

Response UPIU
(with EHS field)

| bLength (02h or 03h for Adv. RPMB) | bEHSType (01h or 03h for Adv. RPMB) | wEHSSubType | EHS Header |
| --- | --- | --- | --- |
| Advanced RPMB Meta Information | | | EHS Data |
| MAC/Key | | | |

[advanced RPMB Message Structure in EHS Field]

| COMMAND UPIU | |
|---|---|
| ⋮ | |
| Total EHS length (03h) | ••• |
| ⋮ | |

| | |
|---|---|
| 0~3 | EHS Header |
| 4~5 | (Req./Resp. Message Type) 0003h |
| 6~21 | (Nonce) Nonce from the host |
| 22~25 | (Write Counter) Current Counter Value |
| 26~27 | (Address / LUN) Address |
| 28~29 | (Block Count) Advanced RPMB Block Count |
| 30~31 | (Result) 0000h |
| 32~63 | (MAC/Key) MAC from the host |
| 64~67 | Bitmap Index |
| 68~69 | Bitmap Support |
| 70~95 | Reserved |

EHS field

[CMD UPIU]

FIG.16B

| RESPONSE UPIU | |
|---|---|
| ⋮ | |
| Total EHS length | ••• |
| ⋮ | |
| 0~3 | EHS Header |
| 4~5 | (Req./Resp. Message Type) 0300h |
| 6~21 | (Nonce) Copy of Nonce |
| 22~25 | (Write Counter) New Counter Value |
| 26~27 | (Address / LUN) Address |
| 28~29 | (Block Count) 0000h |
| 30~31 | (Result) Result Code |
| 32~63 | (MAC/Key) MAC from the device |
| 64~67 | Bitmap Index |
| 68~69 | Bitmap Support |
| 70~95 | Reserved |

EHS field

[Response UPIU]

FIG.17A

| COMMAND UPIU | |
|---|---|
| ⋮ | |
| Total EHS length (03h) | ●●● |
| ⋮ | |

EHS field

| 0~3 | EHS Header |
|---|---|
| 4~5 | (Req./Resp. Message Type) 0006h |
| 6~21 | (Nonce) Nonce from the host |
| 22~25 | (Write Counter) Current Counter Value |
| 26~27 | (Address / LUN) 0000h |
| 28~29 | (Block Count) 0001h |
| 30~31 | (Result) 0000h |
| 32~63 | (MAC/Key) MAC from the host |
| 64~67 | Bitmap Index |
| 68~69 | Bitmap Support |
| 70~95 | Reserved |

[CMD UPIU]

FIG.17B

| RESPONSE UPIU | |
| --- | --- |
| ⋮ | |
| Total EHS length | ••• |
| ⋮ | |
| 0~3 | EHS Header |
| 4~5 | (Req./Resp. Message Type) 0600h |
| 6~21 | (Nonce) Copy of Nonce |
| 22~25 | (Write Counter) New Counter Value |
| 26~27 | (Address / LUN) 0000h |
| 28~29 | (Block Count) 0000h |
| 30~31 | (Result) Result Code |
| 32~63 | (MAC/Key) MAC from the device |
| 64~67 | Bitmap Index |
| 68~69 | Bitmap Support |
| 70~95 | Reserved |

EHS field

[Response UPIU]

| Offset | Field Name | Value |
|--------|-----------|-------|
| 0:3 | Size of Bitmap | 0...00h |
| 4:195 | Bitmap | 0...00h |
| 196:227 | MAC / Key | 0...00h |
| 228:483 | Data | 0...00h |
| 484:499 | Nonce | Nonce from the host |
| 500:503 | Write Counter | 0...00h |
| 504:505 | Address | 0000h |
| 506:507 | Block Count | 0000h |
| 508:509 | Result | 0000h |
| 510:511 | Req./Resp. | 000Ah |

[Get Bitmap Info Request]

FIG.27B

| Offset | Field Name | Value |
|--------|-----------|-------|
| 0:3 | Size of Bitmap | Max Bitmap size from the device |
| 4:195 | Bitmap | Bitmap value from the device |
| 196:227 | MAC / Key | MAC from the device |
| 228:483 | Data | 0...00h |
| 484:499 | Nonce | Copy of the Nonce |
| 500:503 | Write Counter | Counter Value |
| 504:505 | Address | 0000h |
| 506:507 | Block Count | 0000h |
| 508:509 | Result | Result code |
| 510:511 | Req./Resp. | 0A00h |

[Result Read Response]

FIG.28A

| COMMAND UPIU | |
| --- | --- |
| ⋮ | |
| Total EHS length (03h) | ••• |
| ⋮ | |

| | |
| --- | --- |
| 0~3 | EHS Header |
| 4~5 | (Req./Resp. Message Type) 000Ah |
| 6~21 | (Nonce) Nonce from the host |
| 22~25 | (Write Counter) 0...00h |
| 26~27 | (Address / LUN) 0000h |
| 28~29 | (Block Count) 0000h |
| 30~31 | (Result) 0000h |
| 32~63 | (MAC/Key) 0...00h |
| 64~95 | (Bitmap Index) 0...00h |

EHS field

[Get Bitmap Info Request]

FIG.28B

| RESPONSE UPIU | |
|---|---|
| ⋮ | |
| Total EHS length | ••• |
| ⋮ | |

| 0~3 | EHS Header |
|---|---|
| 4~5 | (Req./Resp. Message Type) 0A00h |
| 6~21 | (Nonce) Copy of Nonce |
| 22~25 | (Write Counter) Counter Value |
| 26~27 | (Address / LUN) 0000h |
| 28~29 | (Block Count) 0000h |
| 30~31 | (Result) Result Code |
| 32~63 | (MAC/Key) MAC from the device |
| 64~95 | (Bitmap Index) Bitmap value from the device |

EHS field

[Result Read Response]

FIG.30A

| Command | Bytes in Command | Field Name | Value | Objective |
|---|---|---|---|---|
| Security Send 1 | Data populated by the host and sent to the controller | | | Program data request |
| | 115-N:00 | Stuff bytes | 0...00h | |
| | 117-N:116-N | Bitmap Support | Using Bitmap Index Flag | |
| | 221-N:218-N | Bitmap Index | Index from the Host | |
| | 222:222-(N-1) | MAC/Key | MAC generated by the host | |
| | 223 | RPMB Target | RPMB target to access | |
| | 239:224 | Nonce | 0...00h | |
| | 243:240 | Write Counter | Current Write Counter value | |
| | 247:244 | Address | Address in the RPMB | |
| | 251:248 | Sector Count | Number of 512B blocks | |
| | 253:252 | Result | 0000h | |
| | 255:254 | Request/Response | 0003h (Request) | |
| | (M-1)+256:256 | Data | Data to be written | |

FIG.30B

| Command | Bytes in Command | Field Name | Value | Objective |
|---|---|---|---|---|
| Security Send 2 | Data populated by the host and sent to the controller | | | Request Result of data programming |
| | 115-N:00 | Stuff bytes | 0...00h | |
| | 117-N:116-N | Bitmap Support | Using Bitmap Index Flag | |
| | 221-N:218-N | Bitmap Index | 00000000h | |
| | 222:222-(N-1) | MAC/Key | 0...00h | |
| | 223 | RPMB Target | RPMB target to access | |
| | 239:224 | Nonce | 0...00h | |
| | 243:240 | Write Counter | 00000000h | |
| | 247:244 | Address | 00000000h | |
| | 251:248 | Sector Count | 00000000h | |
| | 253:252 | Result | 0000h | |
| | 255:254 | Request/Response | 0005h (Request) | |

FIG.30C

| Command | Bytes in Command | Field Name | Value | Objective |
|---|---|---|---|---|
| Security Receive 1 | Data populated by the host and sent to the controller | | | Retrieve Result from data programming |
| | 115-N:00 | Stuff bytes | 0...00h | |
| | 117-N:116-N | Bitmap Support | Using Bitmap Index Flag | |
| | 221-N:218-N | Bitmap Index | Index from the Host | |
| | 222:222-(N-1) | MAC/Key | MAC generated by the controller | |
| | 223 | RPMB Target | RPMB target response was sent from | |
| | 239:224 | Nonce | 0...00h | |
| | 243:240 | Write Counter | Incremented Write Counter value | |
| | 247:244 | Address | Address in RPMB | |
| | 251:248 | Sector Count | 00000000h | |
| | 253:252 | Result | Result Code | |
| | 255:254 | Request/Response | 0300h (Response) | |

FIG.31A

| Command | Bytes in Command | Field Name | Value | Objective |
|---|---|---|---|---|
| Security Send 1 | Data populated by the host and sent to the controller | | | Request Device Configuration Block Write |
| | 115-N:00 | Stuff bytes | 0...00h | |
| | 117-N:116-N | Bitmap Support | Using Bitmap Index Flag | |
| | 221-N:218-N | Bitmap Index | Index from the Host | |
| | 222:222-(N-1) | MAC/Key | MAC generated by the host | |
| | 223 | RPMB Target | 00h | |
| | 239:224 | Nonce | 0...00h | |
| | 243:240 | Write Counter | Current Write Counter value | |
| | 247:244 | Address | 00000000h | |
| | 251:248 | Sector Count | 00000001h | |
| | 253:252 | Result | 0000h | |
| | 255:254 | Request/Response | 0006h (Request) | |
| | 767:256 | Data | RPMB Device Configuration Block data structure | |

FIG.31B

| Command | Bytes in Command | Field Name | Value | Objective |
|---|---|---|---|---|
| Security Send 2 | | Data populated by the host and sent to the controller | | Request Result of data programming |
| | 115-N:00 | Stuff bytes | 0...00h | |
| | 117-N:116-N | Bitmap Support | Using Bitmap Index Flag | |
| | 221-N:218-N | Bitmap Index | 00000000h | |
| | 222:222-(N-1) | MAC/Key | 0...00h | |
| | 223 | RPMB Target | RPMB target to access | |
| | 239:224 | Nonce | 0...00h | |
| | 243:240 | Write Counter | 00000000h | |
| | 247:244 | Address | 00000000h | |
| | 251:248 | Sector Count | 00000000h | |
| | 253:252 | Result | 0000h | |
| | 255:254 | Request/Response | 0005h (Request) | |

FIG.31C

| Command | Bytes in Command | Field Name | Value | Objective |
|---|---|---|---|---|
| Security Receive 1 | | Data populated by the host and sent to the controller | | Retrieve Device Configuration Block Write Result |
| | 115-N:00 | Stuff bytes | 0...00h | |
| | 117-N:116-N | Bitmap Support | Using Bitmap Index Flag | |
| | 221-N:218-N | Bitmap Index | Index from the Host | |
| | 222:222-(N-1) | MAC/Key | MAC generated by the controller | |
| | 223 | RPMB Target | 00h | |
| | 239:224 | Nonce | 0...00h | |
| | 243:240 | Write Counter | Incremented Write Counter value | |
| | 247:244 | Address | 00000000h | |
| | 251:248 | Sector Count | 00000000h | |
| | 253:252 | Result | Result Code | |
| | 255:254 | Request/Response | 0600h (Response) | |

FIG.32

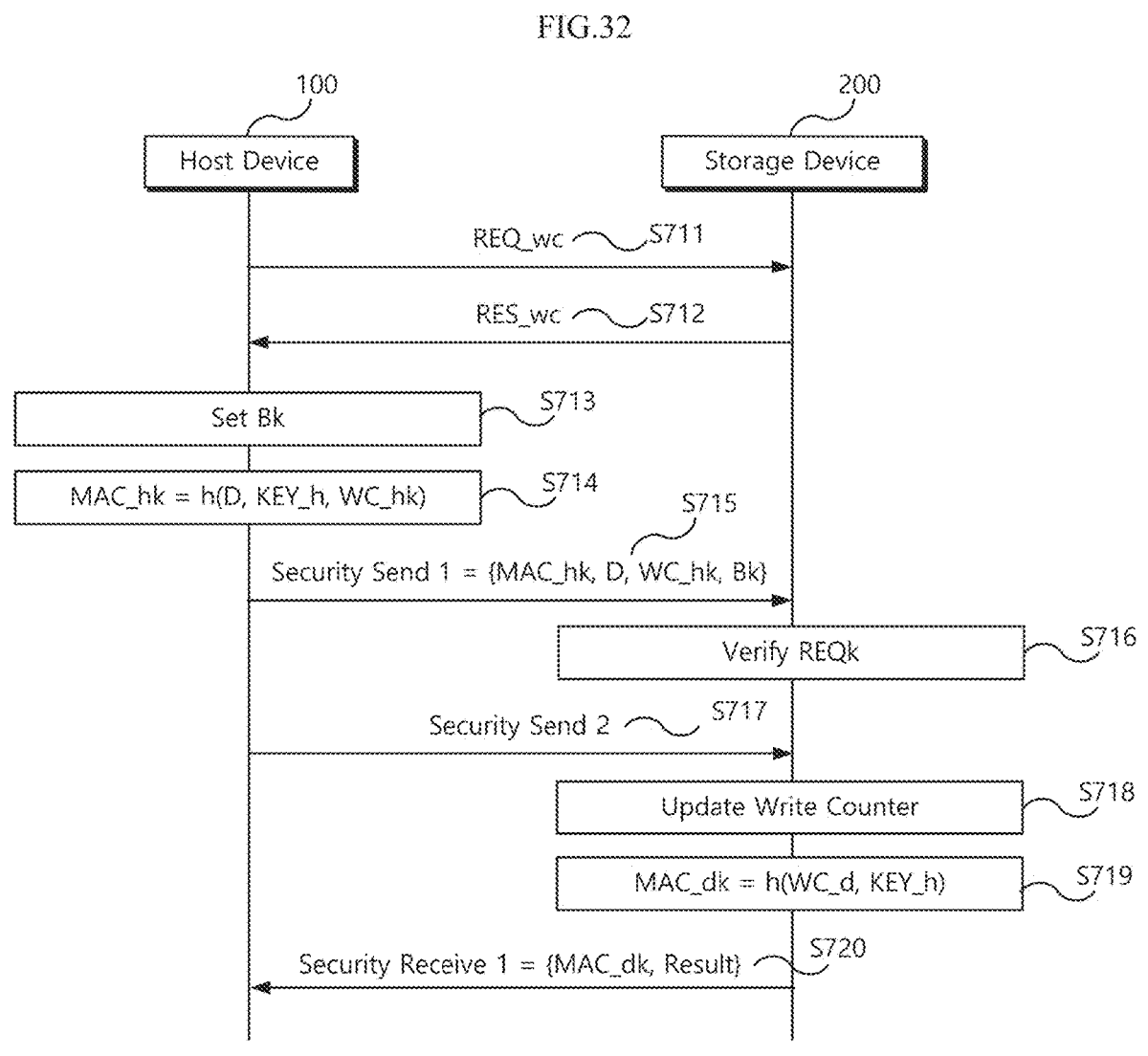

100 Host Device

200 Storage Device

REQ_wc — S711

RES_wc — S712

Set Bk — S713

MAC_hk = h(D, KEY_h, WC_hk) — S714

S715

Security Send 1 = {MAC_hk, D, WC_hk, Bk}

Verify REQk — S716

Security Send 2 — S717

Update Write Counter — S718

MAC_dk = h(WC_d, KEY_h) — S719

Security Receive 1 = {MAC_dk, Result} — S720

FIG.35A

| Offset | Field Name | Value |
|---|---|---|
| 0:3 | Size of Bitmap | 0...00h |
| 222-N:4 | Bitmap | 0...00h |
| 222:222-(N-1) | MAC / Key | 0...00h |
| 223 | RPMB Target | RPMB target to access |
| 239:224 | Nonce | Nonce from the host |
| 243:240 | Write Counter | 0...00h |
| 247:244 | Address | 0000h |
| 251:248 | Sector Count | 0000h |
| 253:252 | Result | 0000h |
| 255:244 | Req./Resp. | 000Ah |

[Get Bitmap Info Request]

FIG.35B

| Offset | Field Name | Value |
|---|---|---|
| 0:3 | Size of Bitmap | Max Bitmap size from the device |
| 222-N:4 | Bitmap | Bitmap value from the device |
| 222:222-(N-1) | MAC / Key | MAC from the device |
| 223 | RPMB Target | RPMB target response was sent from |
| 239:224 | Nonce | Copy of the Nonce |
| 243:240 | Write Counter | Counter Value |
| 247:244 | Address | 0000h |
| 251:248 | Block Count | 0000h |
| 253:252 | Result | Result code |
| 255:244 | Req./Resp. | 0A00h |

[Result Read Response]

STORAGE DEVICE INCLUDING PROTECTED AREA AND DATA WRITE METHOD THEREOF

CROSS-REFERENCE TO RELATED APPLICATION(S)

This application claims benefit of priority to Korean Patent Application No. 10-2023-0050806, filed on Apr. 18, 2023, in the Korean Intellectual Property Office, the disclosure of which is incorporated herein by reference in its entirety.

BACKGROUND

A storage device storing data may be used for various applications. Recently, a storage device including memory devices manufactured by a semiconductor process has been widely used. A storage device may provide a host device with a protected region for storing data requiring security, and may allow only an authenticated access to the protected region. Various attacks may be made on the storage device and/or the host device to obtain and/or modify data stored in the protected area or to insert an error into an access to the protected area.

A replay protected memory block (RPMB) area may be defined as a protected region of a storage device. The RPMB area is an area defined to defend against replay attacks. In the RPMB area, a nonce—a randomly generated value that changes with each transmission or reception of data—is employed as a parameter. However, even in this case, a replay attack reusing a previously used write request cannot be detected and security issues still occur.

SUMMARY

Implementations of this disclosure provide a storage device for effectively detecting a replay attack reusing a previously used request and a data write method of the storage device.

BRIEF DESCRIPTION OF THE DRAWINGS

The above and other aspects, features, and advantages of the present disclosure will be more clearly understood from the following detailed description, taken in conjunction with the accompanying drawings.

FIGS. 8 and 9A-9C are diagrams illustrating an example of a man-in-the-middle attack and some implementations of verifying the man-in-the-middle attack.

FIG. 11 is a diagram illustrating an example of a message data frame used in the storage system of FIG. 10, according to some implementations.

FIGS. 12A-12B are diagrams illustrating an example of a request and a response used in the storage system of FIG. 10 when an authenticated data write operation is performed in a normal RPMB mode, according to some implementations.

FIGS. 13A-13B include diagrams, each illustrating an example of a request and a response used in the storage system of FIG. 10 when a secure write protect configuration block write operation is performed in a normal RPMB mode, according to some implementations.

FIGS. 16A-16B are diagrams illustrating an example of a request and a response used in the storage system of FIG. 10 when an authenticated data write operation is performed in the advanced RPMB mode, according to some implementations.

FIGS. 17A-17B illustrate a diagram illustrating an example of a request and a response used in the storage system of FIG. 10 when a secure write protect configuration block write operation is performed in the advanced RPMB mode, according to some implementations.

FIG. 19 is a flowchart illustrating an example of operation S316 of FIG. 18 in more detail, according to some implementations.

FIGS. 27A-27B include diagrams, respectively illustrating an example of a bitmap read request in a normal RPMB mode and an example of a bitmap read response in response thereto in the normal RPMB mode, according to some implementations.

FIGS. 28A-28B include diagrams, respectively illustrating an example of a bitmap read request in an advanced RPMB mode and a bitmap read response thereto in the advanced RPMB mode, according to some implementations.

FIGS. 30A-30C include diagrams, respectively illustrating examples of commands when the storage system of FIG. 29 performs an authenticated data write operation, according to some implementations.

FIGS. 31A-31C include diagrams, respectively illustrating examples of commands when the storage system of FIG. 29 performs an authenticated device configuration block write operation, according to some implementations.

FIG. 32 is a diagram illustrating an example of a method for the storage system of FIG. 29 to verify a first secure transfer command, according to some implementations.

FIGS. 35A and 35B are diagrams illustrating an example of a bitmap read request of the storage system and a bitmap read response thereto according to some implementations.

DETAILED DESCRIPTION

Hereinafter, implementations will be described with reference to the accompanying drawings.

Figure 1:
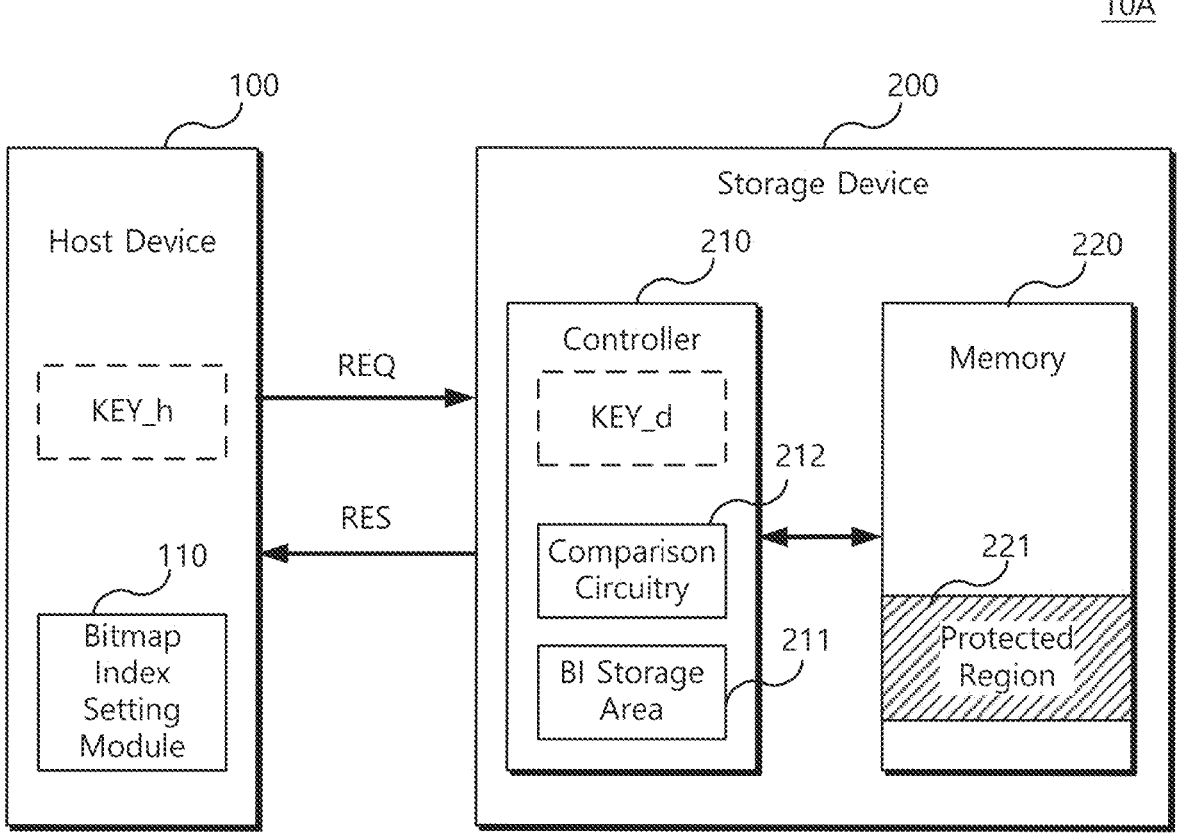
FIG. 1 is a block diagram illustrating an example of a storage system according to some implementations.

FIG. 1 is a block diagram illustrating a storage system 10A according to some implementations.

The storage system 10A according to some implementations may manage history information on a request transmitted from a host device 100 to a storage device 200. For example, the storage system 10A may manage history information through a bitmap index.

In this case, the host device 100 may transmit a request including a bitmap index, and the storage device 200 may verify the request based on the bitmap index. For example, the storage device 200 may compare a bitmap index included in a currently received request with previously received bitmap indexes, and may process the request as a failure when the currently received bitmap index is the same as the previously received bitmap index. Accordingly, a replay attack reusing information on a previously used request may be effectively detected.

A more detailed description will be provided with reference FIG. 1. The storage system 10A may include a host device 100 and a storage device 200 communicating with each other. For example, the storage system 10 may be a fixed system such as a desktop computer, a workstation, a server, a television, a video game console, or the like, or a portable system such as a laptop computer, a tablet PC, a mobile phone, an e-book, a wearable device, or the like. According to some implementations, the storage system 10A may be referred to as a universal flash storage (UFS) system, a nonvolatile memory (NVM) system, or a system.

The host device 100 may refer to any device communicating with the storage device 200, and may also be referred to as a host. For example, the host device 100 may include at least one programmable device such as a central processing unit (CPU), a digital signal processor (DSP), a graphics processing unit (GPU), or a neural network processing unit (NPU), may include a reconfigurable device such as a field programmable gate array (FPGA), or may include a device providing fixed functions, such as an intellectual property (IP) core. According to some implementations, the host device 100 may include a host controller, and the host controller may include at least one programmable device configured to execute software, at least one reconfigurable device, and/or at least one device providing fixed functions.

The host device 100 may communicate with the storage device 200 based on an arbitrary interface. For example, the host device 100 may communicate with the storage device 200 based on a universal flash storage (UFS) interface, an NVM Express (NVMe) interface, a serial advanced technology attachment (SATA) interface, a small computer small interface (SCSI), and a peripheral component interconnect express (PCIe) interface, a universal serial bus (USB) interface, an embedded multi-media card (eMMC) interface, or the like. As illustrated in FIG. 1, the host device 100 may transmit a request REQ to the storage device 200 and receive a response RES from the storage device 200, based on an interface.

In some implementations, the host device 100 may include a bitmap index setting module 110. The bitmap index setting module 110 may generate a bitmap index, and the generated bitmap index may be included in a request REQ and may be transmitted to the storage device 200. In this case, the bitmap index setting module 110 may set different bitmap indexes for each request REQ such that bitmap indexes corresponding to each request REQ do not overlap each other. The storage device 200 may collect bitmap indexes included in each request REQ. The bitmap indexes are history information on previously received requests REQs, and may be used to verify a currently received request REQ. For example, the storage device 200 may compare a bitmap index, included in the currently received request REQ, with previously received bitmap indexes to verify the currently received request REQ.

The storage device 200 may refer to any storage including the memory 220 for storing data. For example, the storage device 200 may be a device supporting a UFS, and the storage device 200 may be referred to as a UFS device. For example, the storage device 200 may be a device supporting NVME, and the storage device 200 may be referred to as an NVM subsystem. Also, the storage device 200 may be an embedded device supporting an embedded universal flash storage (eUFS), an eMMC, or the like, or may be detachably connected to the host 100 like a flash memory card, a compact flash (CF) card, a secure digital (SD) card, a micro-SD card, a mini-SD card, an extreme digital (xD) card, or a memory stick. As illustrated in FIG. 1, the storage device 200 may include a controller 210 and a memory 220.

The memory 220 may have any structure for storing data. For example, the memory 140 may include a nonvolatile memory such as a flash memory, resistive random access memory (RRAM), or the like. Also, for example, a portion of the memory 220 may be used as a buffer. In this case, the storage device 200 may be a bufferless or DRAMless storage device.

The controller 210 may control the memory 220. The controller 210 may receive a request REQ from the host device 100, and may control the memory 220 based on the request REQ. Also, the controller 210 may provide a response RES corresponding to the request REQ to the host device 100.

For example, when the host device 100 requests a data write through the request REQ, the controller 210 may write the data into the memory 220 based on an address included in the request REQ. Then, the controller 210 may provide a response RES, indicating completion of the data write, to the host device 100.

For example, when the host device 100 requests a data read through the request REQ, the controller 210 may read data from the memory 220 based on an address included in the request REQ. Then, the controller 210 may provide a response RES, including the read data, to the host device 100.

The controller 210 may define a protected region 221 as a portion of the memory 220. For example, the protected region 221 may correspond to a RPMB defined in UFS or NVMe. The controller 210 may permit only an authorized access to the protected region 221, and thus the host device 100 may store data requiring security, for example, secure data, in the protected region 221, or may read secure data stored in the protected region 221. To this end, the storage device 200 and the host device 100 may share an authentication key with each other in advance, and may authenticate a request REQ and/or a response RES using a key. For example, the controller 210 may use a device key KEY_d. The device key KEY_d may be stored in a space accessible only by the controller 210, for example, in a portion of the protected region 221. Similarly, the host device 100 may use a host key KEY_h, and the host key KEY_h may be stored in a space accessible only by the host device 100.

The device key KEY_d and the host key KEY_h may be provisioned to the storage device 200 and the host device 100 in various manners, respectively. For example, the device key KEY_d and the host key KEY_h may be provisioned during manufacturing of the storage device 200 and the host device 100, respectively. As another example, the device key KEY_d may be provisioned to the storage device 200 by the request REQ of the host device 100, and the provisioned device key KEY_d may not be rewritten or read. The device key KEY_d and the host key KEY_h may be identical to each other.

Even when the storage device 100 and the host 200 authenticate an access to the protected region 221 using the device key KEY_d and the host key KEY_h, various attacks may be made on the system 10 to obtain and/or modify data stored in the protected area 142 or to insert an error in the access to the protected area 221. For example, a man-in-the-middle attack (MITM) may be made, where an attacker steals and stores a request REQ transmitted from the host device 100 to the storage device 200 and then reuses the request REQ. Such an attack may cause a serious error in the storage system 10A. To defend against such a man-in-the-middle attack, the controller 210 according to some implementations may include a bitmap index storage area 211 and comparison circuitry 212.

The bitmap index storage area 211 may store a bitmap index included in the request REQ received from the host device 100. Since the host device 110 sets different bitmap indexes for each request REQ, bitmap indexes stored in the bitmap index storage area 211 may correspond to different requests REQ.

In some implementations, the bitmap index storage area 211 may store a bitmap index included in the request REQ, regardless of success or failure of the request REQ. In this case, a plurality of bitmap indexes corresponding to a plurality of requests REQs received from the host device 100 may be stored in the bitmap index storage area 211. Such bitmap indexes are history information on the previously received requests REQs, and may be used to verify the currently received requests REQ.

In some implementations, the bitmap index storage area 211 may store only a bitmap index included in a failed request REQ. In this case, a plurality of bitmap indexes corresponding to failed requests REQs, among a plurality of requests REQs received from the host device 100, may be stored in the bitmap index storage area 211. Such bitmap indexes are history information on failed requests REQs, among previously received REQs, and may be used to verify the currently received REQ.

The comparison circuitry 212 may compare a bitmap index, included in the currently received request REQ, with previously received bitmap indexes stored in the bitmap index storage area 211.

In some implementations, when the currently received bitmap index is the same as one of the previously received bitmap indexes, the comparison circuitry 212 may determine that the currently received request REQ reuses the previously used request REQ. For example, the comparison circuitry 212 may determine that the currently received request REQ is a reused request REQ stolen by an attacker in the past, and may process the currently received request REQ as a failure.

In some implementations, when the currently received bitmap index is not the same as one of the previously received bitmap indexes, the comparison circuitry 212 may determines that the currently received request REQ does not reuse the previously used request REQ. In this case, the controller 210 may perform additional authentication on the currently received request REQ.

For example, the controller 210 may perform the additional authentication by calculating a message authentication code MAC using information (for example, an address, data, or the like) included in the currently received request REQ, and comparing the calculated message authentication code MAC with a message authentication code MAC included in the currently received request REQ. Hereinafter, for ease of description, the message authentication code MAC calculated by the controller 210 using the information included in the currently received request REQ will be referred to as a message verification code MVC. When the message verification code MVC calculated by the controller 210 and a message verification code MAC of a request REQ are different from each other, the controller 210 may process the request REQ as a failure.

As another example, the controller 210 may perform additional authentication by comparing a write counter, stored in the storage device 200, with a write counter included in the currently received request REQ. When the two write counters are different from each other, the controller 210 may process the request as a failure.

As another example, the controller 210 may first perform additional authentication to compare the message verification code MVC with the message authentication code MAC of the request REQ, and then perform additional authentication to compare two write counters with each other when the message verification code MVC is the same as the message authentication code MAC.

As described above, the storage system 10A according to some implementations may manage history information on a request, transmitted from the host device 100 to the storage device 200, and may authenticate the currently received request REQ using history information stored in the storage device 200. Accordingly, a replay attack reusing information on a previously used request REQ may be effectively detected. As a result, security for the protected region 221 may be enhanced.

Figure 2:
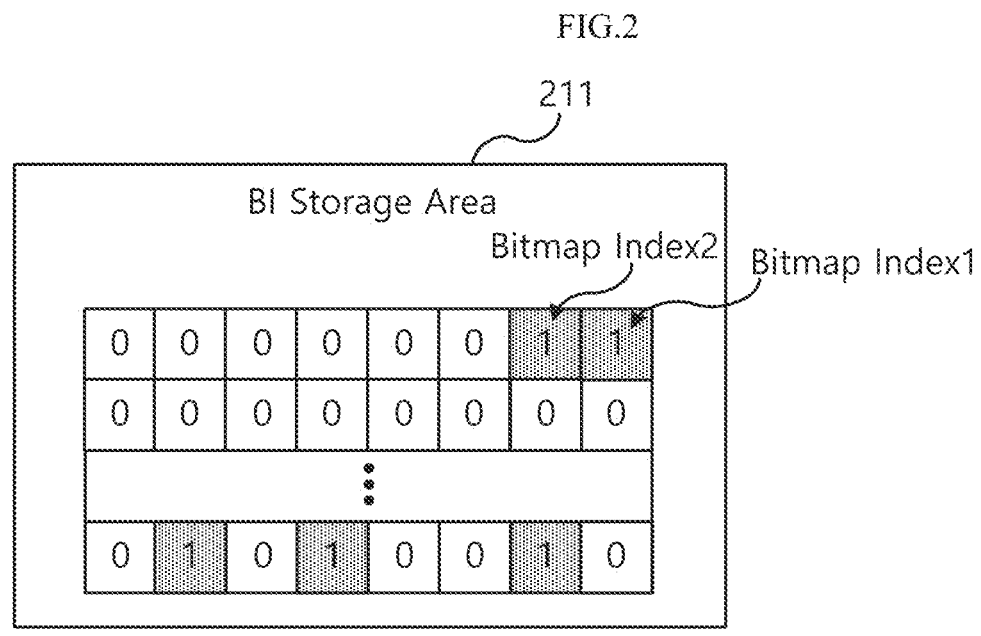
FIG. 2 is a diagram illustrating an example of a bitmap index storage area of FIG. 1, according to some implementations.

FIG. 2 is a diagram illustrating an example of the bitmap index storage area 211 of FIG. 1, according to some implementations.

As illustrated in FIG. 2, a plurality of bitmap indexes corresponding to requests REQ transmitted from the host device 100 may be stored in the bitmap index storage area 211.

The bitmap indexes stored in the bitmap index storage area 211 may correspond to different requests REQ, respectively. For example, a first bitmap index Bitmap Index1 may correspond to a first write request transmitted from the host device 100, and a second bitmap index Bitmap Index2 may correspond to a second write request transmitted from the host device 100.

According to some implementations, bitmap indexes received from the host device 100 may be stored in the bitmap index storage area 211 regardless of success or failure of a request. According to some implementations, only bitmap indexes corresponding to requests processed as failures may be stored in the bitmap index storage area 211.

Each bitmap index may record information on each request in units of bits. For example, a bitmap index having a value of '1' may indicate that a corresponding request has been processed as a 'failure.' A bitmap index having a value of '0' may indicate that the corresponding request has been processed as a 'success.'

Since each bitmap index is implemented in a small unit such as 1 bit, many bitmap indexes may be stored in the bitmap index storage area 211. For example, a large amount of history information may be recorded and managed in a small storage space.

For ease of description, an example is provided where the bitmap index storage area 211 is implemented to have a storage space of 16 bytes and each bitmap index has a size of 1 bit. In this case, a total of 128 bitmap indexes may be stored in the bitmap index storage area 211. For example, 128 bitmap indexes used for authentication of the protected region 221 may be stored in the bitmap index storage area 211.

In general, a single nonce has a size of 16 bytes, so that only a single nonce can be stored in a storage space of 16 bytes. Accordingly, a large amount of storage space is required to manage history information on requests REQ using a nonce generated by a host device. However, the storage system 10A according to some implementations uses a bitmap index having a size of 1 bit, so that history information corresponding to a plurality of requests REQ may be managed using a small storage space.

Figure 3:
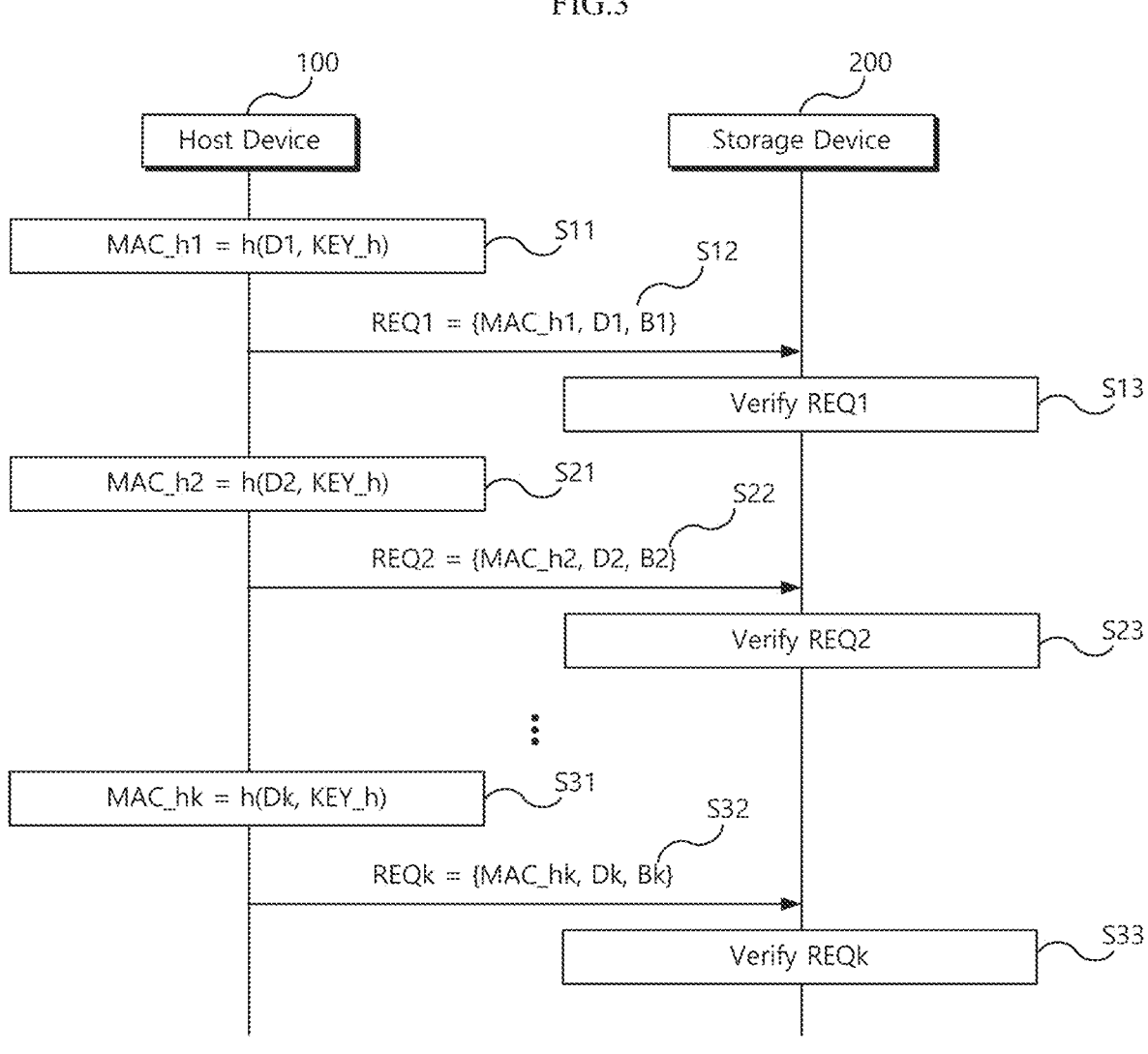
FIG. 3 is a flowchart illustrating an example of a method of operating the storage system of FIG. 1, according to some implementations.

FIG. 3 is a flowchart illustrating an example of a method of operating the memory system 10A of FIG. 1, according to some implementations. For ease of description, an example is provided where a plurality of requests REQ1 to REQk are transmitted from the host device 100 to the storage device 200 and the requests REQ1 to REQk are write requests for writing data in the protected region 221.

In operation S11, the host device 100 may generate a first message authentication code MAC_h1. For example, the host device 100 may calculate the first message authentication code MAC_h1 using a hash function such as HMAC SHA-256. A host key KEY_h and a message may be used for the calculation of the first message authentication code MAC_h1, and the message may include the first data D1. However, this is only an example, and the host device 100 may calculate the first message authentication code MAC_h1 using various hash functions such as message digest algorithm 5 (MD5) and secure hash algorithm 1 (SHA1).

In operation S12, the host device 100 may provide a first request REQ1 to the storage device 200. The first request REQ1 may include the first message authentication code MAC_h1, the first data D1, and a first bitmap index B1. The first bitmap index B1 may correspond to a first request REQ1.

In operation S13, the storage device 200 may receive and verify the first request REQ1. For example, the storage device 200 may verify the first request REQ1 based on the first message authentication code MAC_h1, the first data D1, and a first bitmap index B1 included in the first request REQ. In this case, the storage device 200 may verify the first request REQ1 by comparing the currently received first bitmap index B1 with one of previously received bitmap indexes to determine whether they match each other.

In operation S21, the host device 100 may generate a second message authentication code MAC_h2. The host key KEY_h and a message may be used to calculate the second message authentication code MAC_h2, and the message may include the second data D2.

In operation S22, the host device 100 may provide a second request REQ2 to the storage device 200. The second request REQ2 may include a second message authentication code MAC_h2, second data D2, and a second bitmap index B2. The second bitmap index B2 may correspond to the second request REQ2.

In operation S23, the storage device 200 may receive and verify the second request REQ2. In this case, the storage device 200 may verify the second request REQ2 by comparing the currently received second bitmap index B2 with one of the previously received bitmap indexes to determine whether they match each other.

In a similar manner, in operation S31, the host device 100 may generate a k-th message authentication code MAC_hk. In operation S32, the host device 100 may provide a k-th request REQk to the storage device 200. In operation S33, the storage device 200 may receive and verify the k-th request REQk.

Figure 4:
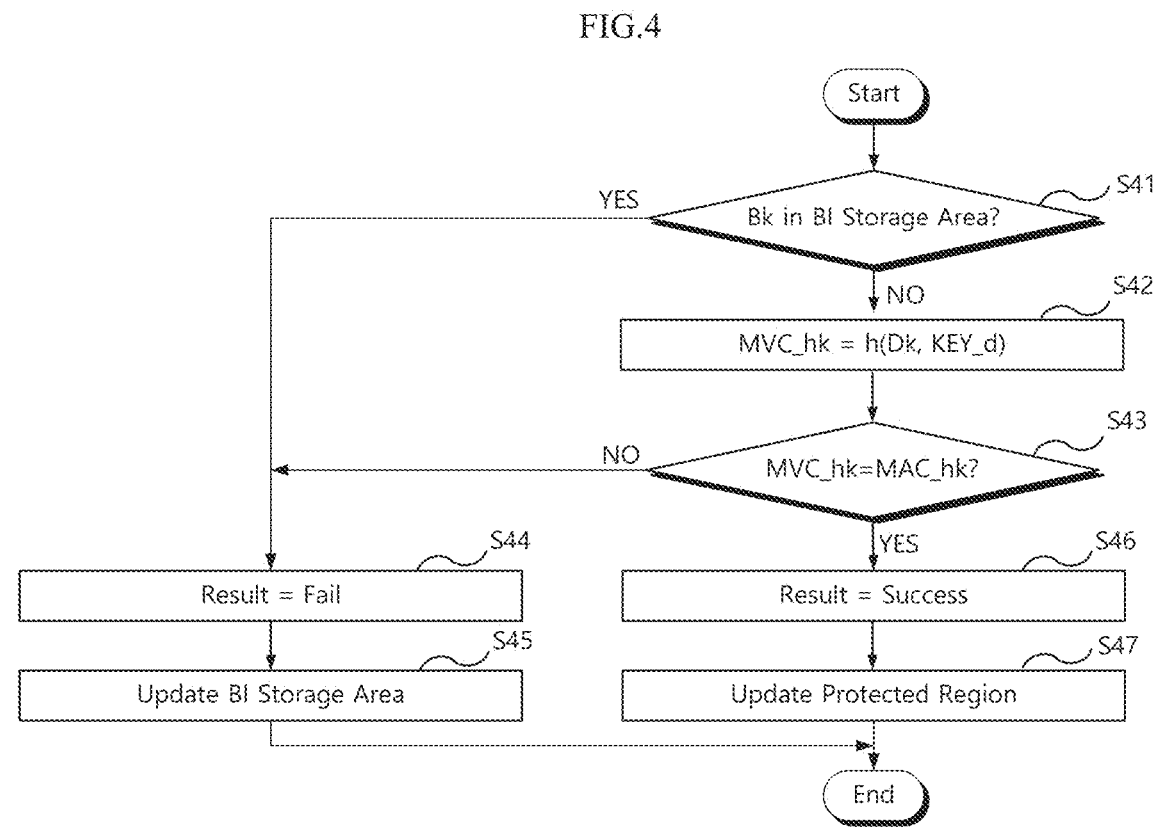
FIG. 4 is a flowchart illustrating an example of a method for a storage device to verify a request received from a host device in FIG. 3, according to some implementations.

FIG. 4 is a flowchart illustrating an example of a method for the storage device 200 to verify a request received from the host device 100 in FIG. 3, according to some implementations. For ease of description, in FIG. 4, an example is provided where the request currently received by the storage device 200 is a k-th request REQk and the k-th request REQk includes a message authentication code MAC_hk, data Dk, and a bitmap index Bk.

In operation S41, a check may be made as to check whether the currently received bitmap index Bk is the same as one of the previously received bitmap indexes. For example, the storage device 200 may check whether the currently received bitmap index Bk is the same as a currently received bitmap index Bk, among the bitmap indexes stored in the bitmap index storage area 211 (see FIG. 2).

When the same bitmap index is present, it may be determined that the currently received request REQk is a man-in-the-middle attack reusing a previously received request. In this case, the flow may proceed to operation S44 in which the currently received request REQk is processed as a failure.

When the same bitmap index is absent, the flow may proceed to operation S42 in which additional authentication is performed.

In operation S42, a message verification code MVC_hk may be generated. For example, the storage device 200 may extract the data Dk from the currently received request REQk and calculate the message verification code MVC_hk using a device key KEY_d stored in the storage device 200.

In this case, the storage device 200 may calculate the message verification code MVC_hk using a hash function such as HMAC SHA-256. However, this is only an example, and the storage device 200 may calculate the message verification code MVC_hk using various hash functions such as message digest algorithm 5 (MD5) and secure hash algorithm 1 (SHA1). According to some implementations, the message verification code MVC may be referred to as a message verification code MAC.

In operation S43, it may be determined whether the calculated message verification code MVC_hk matches the message verification code MAC_hk included in the currently received request REQk.

When the message verification code MVC_hk and the message verification code MAC_hk of the request REQk do not match each other, the flow may proceed to operation S44 in which the currently received request REQk is processed as a failure.

When the message verification code MVC_hk and the message verification code MAC_hk of the request REQk match each other, the flow may proceed to operation S46 in which the currently received request REQk is processed as a success.

In operation S44, the currently received request REQk may be processed as a failure. In this case, the storage device 200 may not write the data Dk, included in the request, into the protected region 221.

In operation S45, bitmap indexes stored in the bitmap index storage area 211 may be updated. For example, the storage device 200 may update a bitmap index Bk corresponding to the failed request REQk in the bitmap index storage area 211. However, according to some implementations, when the bitmap index Bk is already stored in the bitmap index storage area 211, operation S45 may be omitted.

In operation S46, the currently received request REQk may be processed as a success. In this case, in operation S47, an update operation in which the data Dk included in the currently received request REQk is written into the protected region 221 (see FIG. 1) may be performed. Also, according to some implementations, an operation in which the bitmap index Bk corresponding to the currently received request REQk is updated in the bitmap index storage area 211 may be additionally performed.

As described above, history information on a request transmitted from the host device 100 to the storage device 200 through a bitmap index may be managed, and thus the storage system 10A according to some implementations may effectively detect a main-in-the-middle attack reusing a previously received request.

In FIG. 4, the order of verifying the currently received request REQk may vary according to some implementations, which will be described below in more detail with reference to FIG. 5.

Figure 5:
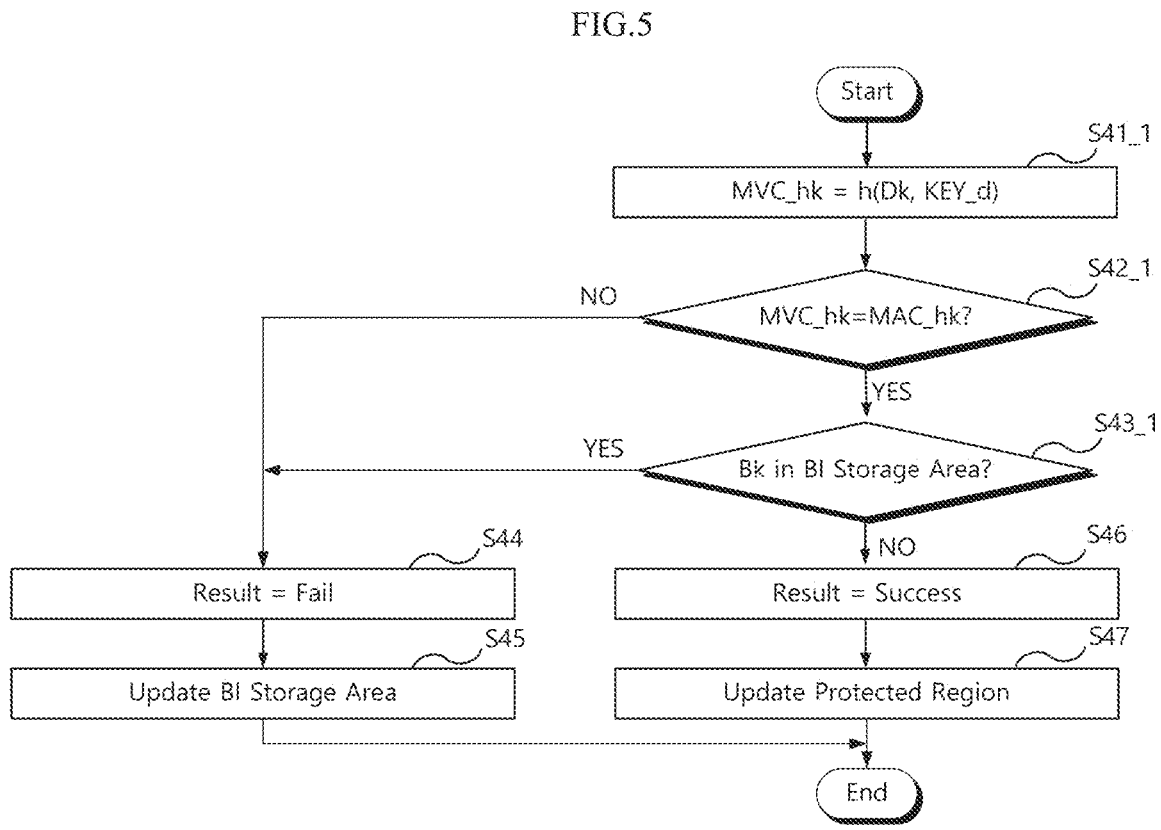
FIG. 5 is a flowchart illustrating another example of a method for the storage device to verify a request received from the host device in FIG. 3, according to some implementations.

FIG. 5 is a flowchart illustrating another example of a method for the storage device 200 to verify a request received from the host device 100 in FIG. 3, according to some implementations. The method of FIG. 5 is similar to the method of FIG. 4. Therefore, redundant descriptions will be omitted below.

Unlike the method of FIG. 4, in the method of FIG. 5, a currently received request REQk may be verified using a message authentication code MAC, and a verification operation using a bitmap index may then be performed.

In more detail, in operation S41_1, a message verification code MVC_hk may be calculated by the storage device 200.

In operation S42_1, a determination may be made as to whether the calculated message verification code MVC_hk matches the message verification code MAC_hk included in the currently received request REQk.

When the message verification code MVC_hk and the message verification code MAC_hk of the request REQk do not match each other, the flow may proceed to operation S44 in which the currently received request REQk is processed as a failure. When the message verification code MVC_hk and the message verification code MAC_hk of the request REQk match each other, the flow may proceed to operation S43_1 in which additional authentication is performed.

In operation S43_1, a check may be made as to whether a currently received bitmap index Bk is the same as one of previously received bitmap indexes.

When the same bitmap index is present, it may be determined that the currently received request REQk is a man-in-the-middle attack reusing a previously received request. In this case, operation S44 in which the currently received request REQk is processed as a failure may be performed. When the same bitmap index is absent, operation S46 in which the currently received request REQk is processed as a success may be performed.

As described above, a method of verifying a currently received request of the storage device 200 may be modified according to some implementations.

Figure 6:
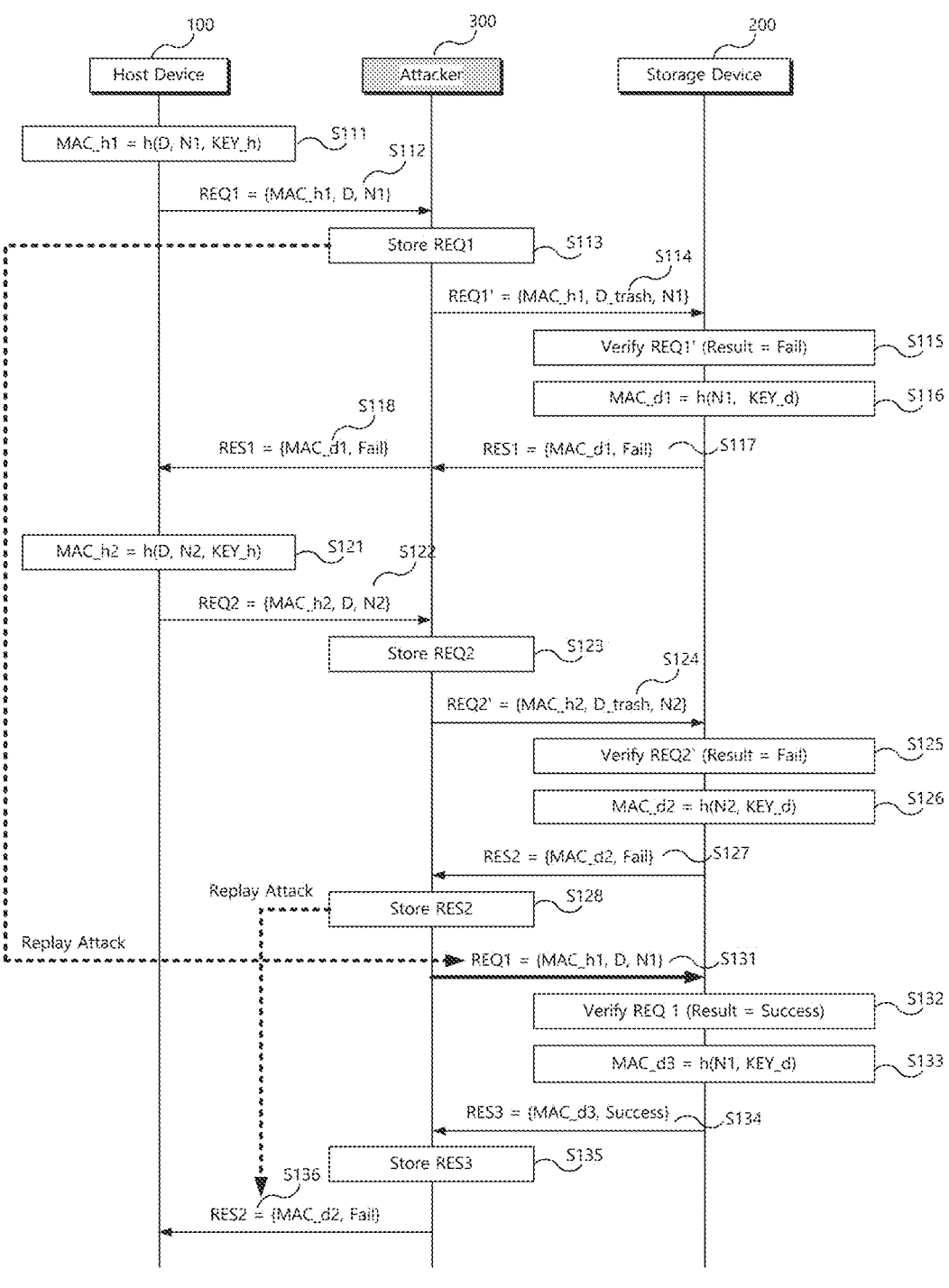
FIGS. 6 and 7A-7C are diagrams illustrating an example of a man-in-the-middle attack and some implementations of verifying the man-in-the-middle attack.
Figures 7A, 7B:
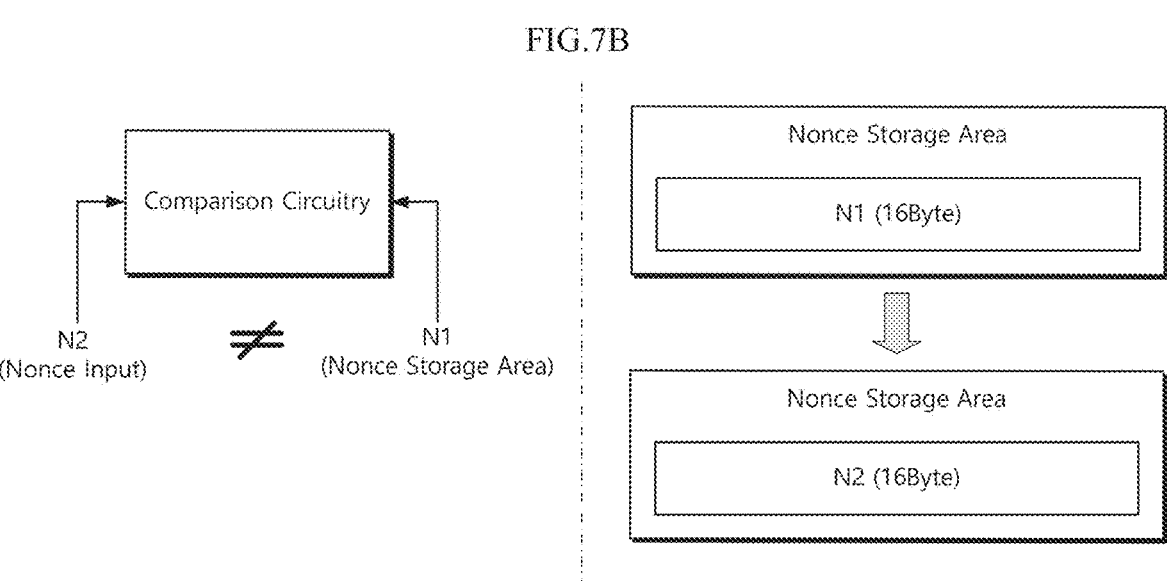
Figure 7C:
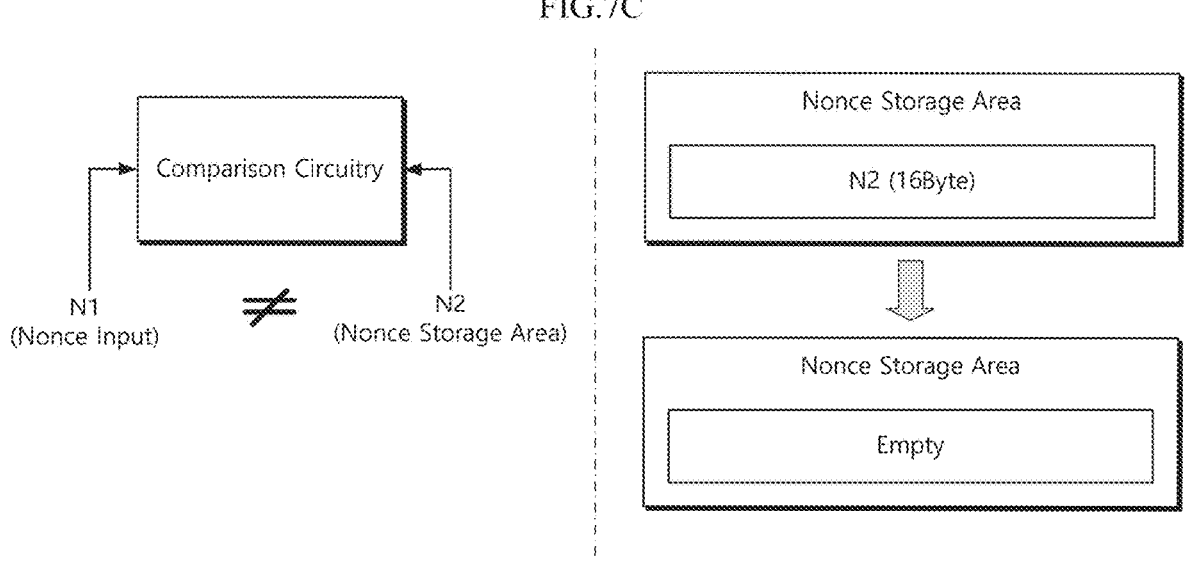

FIGS. 6 and 7A-7C are diagrams illustrating an example of a man-in-the-middle attack and some implementations of verifying the man-in-the-middle attack. In detail, FIG. 6 illustrates an example of a man-in-the-middle attack using a previously stolen request, and FIGS. 7A-7C illustrate an example of defending against the man-in-the-middle attack using a nonce.

For ease of description, in FIGS. 6 and 7A-7C, an example is provided where a nonce storage area has a size of 16 bytes and a nonce also has a size of 16 bytes. Since both the nonce storage area and the nonce have the size of 16 bytes, in FIGS. 6 and 7A-7C, an example is provided where the nonce storage area stores only a nonce corresponding to a request processed as a failure in the previous operation.

Referring to FIG. 6, in operation S111, the host device 100 may generate a first nonce N1, and may generate a first message authentication code MAC_h1 based on data D, the first nonce N1, and a host key KEY_h. The message authentication code MAC_h1, generated by the host device 100, may be referred to as a first host message authentication code MAC_h1.

In operation S112, the host device 100 may issue a first request REQ1. The first request REQ1 is a write request, and may include a first host message authentication code MAC_h1, data D, and a first nonce N1.

In operation S113, an attacker 300 may steal and store the first request REQ1.

In operation S114, the attacker 300 may modulate the first request REQ1. For example, the attacker 300 may modulate the first request to include trash data D_trash rather than normal data D. The attacker 300 may provide a modified first request REQ1' to the storage device 200.

In operation S115, the storage device 200 may verify the modulated first request REQ1'. For example, the storage device 200 may include comparison circuitry, and the comparison circuitry may determine whether the currently received first nonce N1 is the same as a nonce stored in a nonce storage area. When the currently received nonce N1 is not the same as the nonce stored in the nonce storage area, the storage device 200 may perform additional authentication using the first host message authentication code MAC_h1.

For example, as illustrated in FIG. 7A, the nonce storage area may be empty. In this case, the comparison circuitry of the storage device 200 may determine that the currently received first nonce N1 is not the same as the nonce stored in the nonce storage area. However, data included in the modulated first request REQ1' is the trash data D_trash, so that the storage device 200 may process the request REQ1' as a failure in a verify operation using the first host message authentication code MAC_h1. Accordingly, the storage device 200 may store the first nonce N1, included in the currently received request REQ1' processed as a failure, in the nonce storage area, as illustrated in FIG. 7A.

In operation S116, the storage device 200 may generate a message authentication code MAC_d1. For example, the storage device 200 may generate the message authentication code MAC_d1 based on the first nonce N1 and the device key KEY_d. The message authentication code MAC_d1, generated by the storage device 200, may be referred to as a first device message authentication code MAC_d1.

In operation S117, the storage device 200 may issue a first response RES1. The first response RES1 may include the first device message authentication code MAC_d1 and a result of failure.

In operation S118, the attacker 300 may transmit the first response RES1 to the host device 100 as is. Accordingly, the host device 100 may identify that a data write operation based on the first request REQ1 that has failed.

Continuing to refer to FIG. 6, in operation S121, the host device 100 may generate a second nonce N2, and may generate a second host message authentication code MAC_h2 based on the data D, the second nonce N1, and the host key KEY_h.

In operation S122, the host device 100 may issue a second request REQ2. The second request REQ2 is a write request and may include a second host message authentication code MAC_h2, data D, and a second nonce N2.

In operation S123, the attacker 300 may steal and store the second request REQ2.

In operation S124, the attacker 300 may modulate the second request REQ2. For example, the attacker 300 modulates the second request REQ2 to include trash data D_trash rather than normal data D and may provide a modulated second request REQ2' to the storage device 200.

In operation S125, the storage device 200 may verify the modulated second request REQ2'. For example, the first nonce N1 may be stored in the nonce storage area, as illustrated in FIG. 7B. In this case, the comparison circuitry of the storage device 200 may determine that the currently received second nonce N2 is not the same as the first nonce N1 stored in the nonce storage area.

However, the data included in the modulated second request REQ2' is trash data D_trash, so that the storage device 200 may process the request REQ2' as a failure in a verify operation using the second host message authentication code MAC_h2. Accordingly, the storage device 200 may delete the first nonce N1 stored in the nonce storage area and may store the second nonce N2, included in the currently received request REQ2', in the nonce storage area, as illustrated in FIG. 7B.

In operation S126, the storage device 200 may generate a second device message authentication code MAC_d2.

In operation S127, the storage device 200 may issue a second response RES2. The second response RES2 may include the second device message authentication code MAC_d2 and a result of failure.

In operation S128, the attacker 300 may steal and store the second response RES2.

In operation S131, the attacker 300 may transmit the previously stolen first request REQ1 to the storage device 200.

In operation S132, the storage device 200 may verify the first request REQ1. For example, the second nonce N2 may be stored in the nonce storage area, as illustrated in FIG. 7C. In this case, the comparison circuitry of the storage device 200 may determine that the currently received first nonce N1 is not the same as the second nonce N2 stored in the nonce storage area. In addition, since the data included in the first request REQ1 is normal data D, the storage device 200 may process the request REQ1 as a success in a verify operation using the first host message authentication code MAC_h1. As a result, the storage device 200 may delete the second nonce N2 stored in the nonce storage area and write the data D1 in the protected region 221 (see FIG. 1), as illustrated in FIG. 7C.

In operation S133, the storage device 200 may generate a third device message authentication code MAC_d3.

In operation S134, the storage device 200 may issue a third response RES3. The third response RES3 may include the third device message authentication code MAC_d3 and a result of success.

In operation S135, the attacker 300 may steal and store the third response RES3.

In operation S136, the attacker 300 may transmit the previously stolen second response RES to the host device 100. Accordingly, the host device 100 may identify that a data write operation based on the second request REQ2 that has failed.

As a result, although the data included in the first request REQ1 is written in the protected region 221 and the data included in the second request REQ2 is not written in the protected region 221, the host device 100 may incorrectly identify that both data included in the first request REQ1 and data included in the second request REQ2 are not written in the protected region 221. As described above, the host device 100 incorrectly identifies an actual state of the protected region 221, so that an error may occur in the storage system.

To defend against such a man-in-the-middle attack, the memory system according to some implementations may implement a nonce storage area using a large storage space. However, in this case, a larger storage space may be required as the number of nonces to be stored increases.

To defend against a man-in-the-middle attack using a small storage space, the memory system 10A according to some implementations may manage history information on a request, transmitted from the host device 100 to the storage device 200, using a bitmap index. Accordingly, a man-in-the-middle attack may be efficiently defended while managing the history information using relatively low storage capacity.

Figure 8:
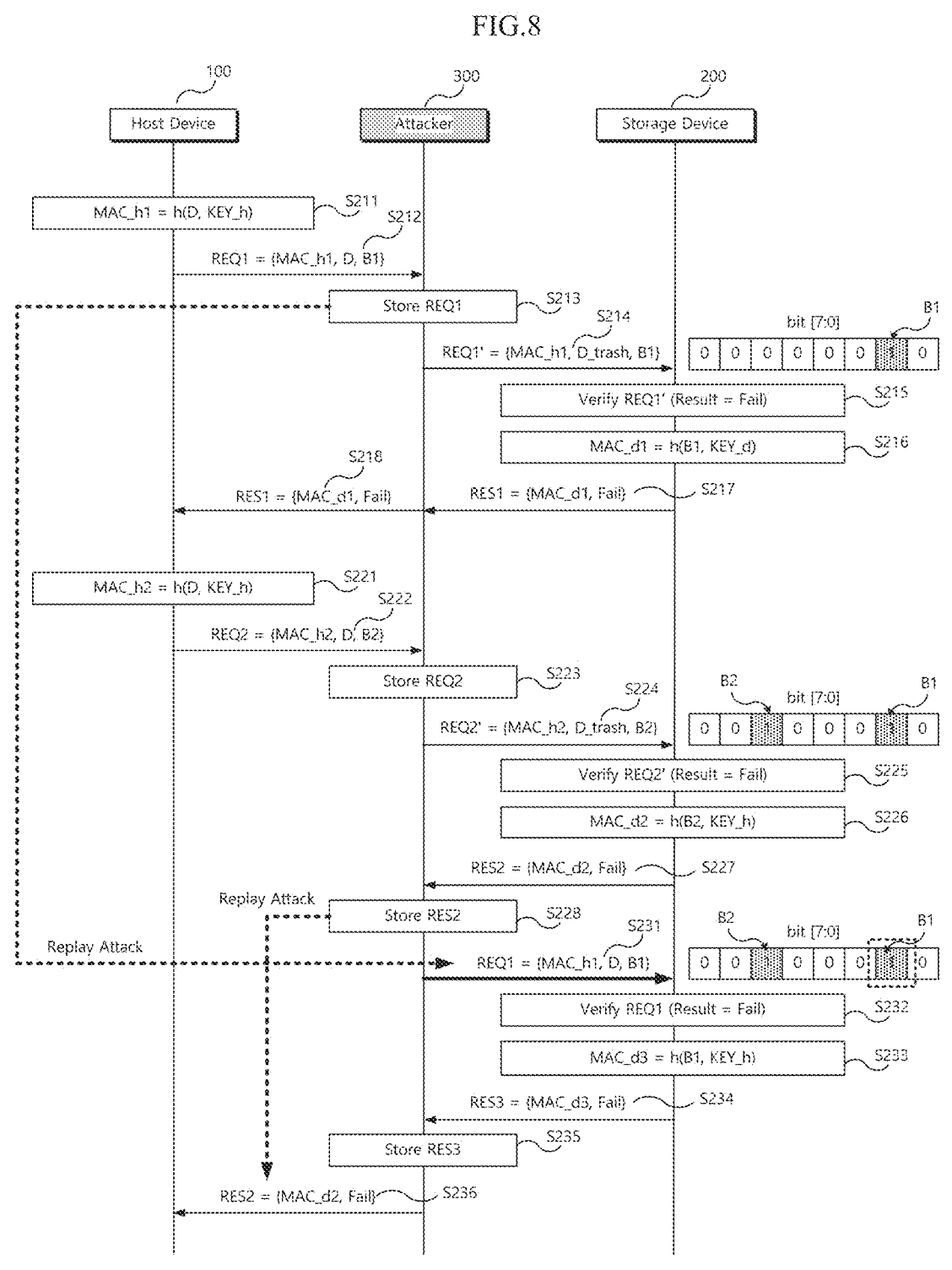

FIGS. 8 and 9A-9C are diagrams illustrating an example of a man-in-the-middle attack and some implementations of verifying the man-in-the-middle attack. In detail, FIGS. 7A-7C illustrates an example of a man-in-the-middle attack using a previously stolen request, and FIG. 8 illustrates an example of defending against the man-in-the-middle attack using a bitmap.

Similarly to FIGS. 6 and 7A-7C, in FIGS. 8 and 9A-9C, an example is provided where an attacker steals a first request REQ1 and reuses the stolen first request REQ1 to perform a man-in-the-middle attack. For ease of description, in FIGS. 8 and 9A-9C, an example is provided where the bitmap index storage area 211 (see FIG. 1) has a size of 8 bits and each bitmap index has a size of 1 bit. In addition, an example is provided where a first bitmap index B1 corresponds to a bit corresponding to a second column in a bitmap of the bitmap index storage area 211 and a second bitmap index B2 corresponds to a bit corresponding to a fifth column in the bitmap of the bitmap index storage area 211.

Referring to FIG. 8, in operation S211, the host device 100 may generate a first host message authentication code MAC_h1 based on data D and a host key KEY_h. Also, the host device 100 may generate a first bitmap index B1.

In operation S212, the host device 100 may issue a first request REQ1. The first request (REQ1) is a write request, and may include a first host message authentication code MAC_h1, data D, and a first bitmap index B1.

In operation S213, the attacker 300 may steal and store the first request REQ1.

In operation S214, the attacker 300 may modulate the first request REQ1. For example, the attacker 300 may modulate a first request to include trash data D_trash rather than the normal data D, and may provide the modulated first request REQ1' to the storage device 200.

In operation S215, the storage device 200 may verify the modulated first request REQ1'. For example, the storage device 200 may include comparison circuitry 212 (see FIG. 1), and the comparison circuitry 212 may determine whether the currently received bitmap index B1 is the same as one of the map indexes stored in the bitmap index storage area 211. When the currently received bitmap index B1 is not the same as the bitmap indexes stored in the bitmap index storage area 211, the storage device 200 may perform additional authentication using the first host message authentication code MAC_h1.

For example, the bitmap index storage area 211 may be empty, as illustrated in FIG. 8A. In this case, the comparison circuitry 212 of the storage device 200 compares the currently received bitmap index B1 with the bitmap indexes of the bitmap index storage area 211, and the storage device 200 may identify that currently received bitmap index B1 is a bitmap index received first.

However, the data included in the modulated first request REQ1' is trash data D_trash, so that the storage device 200 may process the request REQ1' as a failure in a verify operation using the first host message authentication code MAC_h1. Accordingly, the storage device 200 may store the first bitmap index B1, included in the failed request REQ1', in the bitmap index storage area 211, as illustrated in FIG. 9A.

In operation S216, the storage device 200 may generate a first device message authentication code MAC_d1. For example, the storage device 200 may generate a first device message authentication code MAC_d1 based on the first bitmap index B1 and the device key KEY_d.

In operation S217, the storage device 200 may issue a first response RES1. The first response RES1 may include the first device message authentication code MAC_d1 and a result of failure.

In operation S218, the attacker 300 may transmit the first response RES1 to the host device 100 as is. Accordingly, the host device 100 may determine that a data write operation based on the first request REQ1 that has failed.

Continuing to refer to FIG. 8, in operation S221, the host device 100 may generate a first host message authentication code MAC_h1 based on the data D and the host key KEY_h. Also, the host device 100 may generate a second bitmap index B2.

In operation S222, the host device 100 may issue a second request REQ2. The second request REQ2 is a write request and may include a second host message authentication code MAC_h2, data D, and a second bitmap index B2.

In operation S223, the attacker 300 may steal and store the second request REQ2.

In operation S224, the attacker 300 may modulate the second request REQ2. For example, the attacker 300 may modulate the second request REQ2 to include trash data D_trash rather than normal data D, and may provide the modulated second request REQ2' to the storage device 200.

In operation S225, the storage device 200 may verify the modulated second request REQ2'. For example, the first bitmap index B1 may be stored in the bitmap index storage area 211, as illustrated in FIG. 9B. In this case, the comparison circuitry 212 of the storage device 200 may determine that the currently received second bitmap index B2 is not the same as the bitmap indexes stored in the bitmap index storage area 211.

However, the data included in the modulated second request REQ2' is trash data D_trash, so that the storage device 200 may process the request REQ2' as a failure in a verify operation using the second host message authentication code MAC_h2. Accordingly, the storage device 200 may additionally store the second bitmap index B2 in the bitmap index storage area 211, as illustrated in FIG. 9B.

In operation S226, the storage device 200 may generate a second device message authentication code MAC_d2.

In operation S227, the storage device 200 may issue a second response RES2. The second response RES2 may include the second device message authentication code MAC_d2 and a result of failure.

In operation S228, the attacker 300 may steal and store the second response RES2.

In operation S231, the attacker 300 may transmit the previously stolen first request REQ1 to the storage device 200.

In operation S232, the storage device 200 may verify the first request REQ1. For example, the first and second bitmap indexes B1 and B2 may be stored in the bitmap index storage area 211, as illustrated in FIG. 9C. In this case, the comparison circuitry 212 of the storage device 200 may identify that the currently received bitmap index B1 is the same as the previously received bitmap index B1. Accordingly, the storage device 200 may process the currently received request REQ1 as a failure. Thus, normal data D included in the first request REQ1 may not be written in the protected region 221.

In operation S233, the storage device 200 may generate a third device message authentication code MAC_d3.

In operation S234, the storage device 200 may issue a third response RES3. The third response RES3 may include the third device message authentication code MAC_d3 and a result of failure.

In operation S235, the attacker 300 may steal and store the third response RES3.

In operation S236, the attacker 300 may transmit the previously stolen second response RES to the host device 100. Accordingly, the host device 100 may identify that a data write operation based on the second request REQ2 that has failed.

As a result, although the attacker performed the same replay attack as described in FIGS. 7A-7C, both the first request REQ1 and the second request REQ2 were processed as failures in the storage device 200 and the host device 100 correctly recognized that both the first request REQ1 and the second request REQ2 were processed as failures. Accordingly, an error causing the host device 100 to misidentify an actual state of the protected region 221 does not occur, and thus a man-in-the-middle attack using a previously used request may be effectively defended.

It will be appreciated that the above description is merely exemplary and various modifications and changes may be made. For example, the technical concept of some implementations may be changed and applied depending on the type and operation mode of an interface between the host device 100 and the storage device 200. Hereinafter, various implementations depending on the type of interface and operation mode will be described in more detail.

Figure 10:
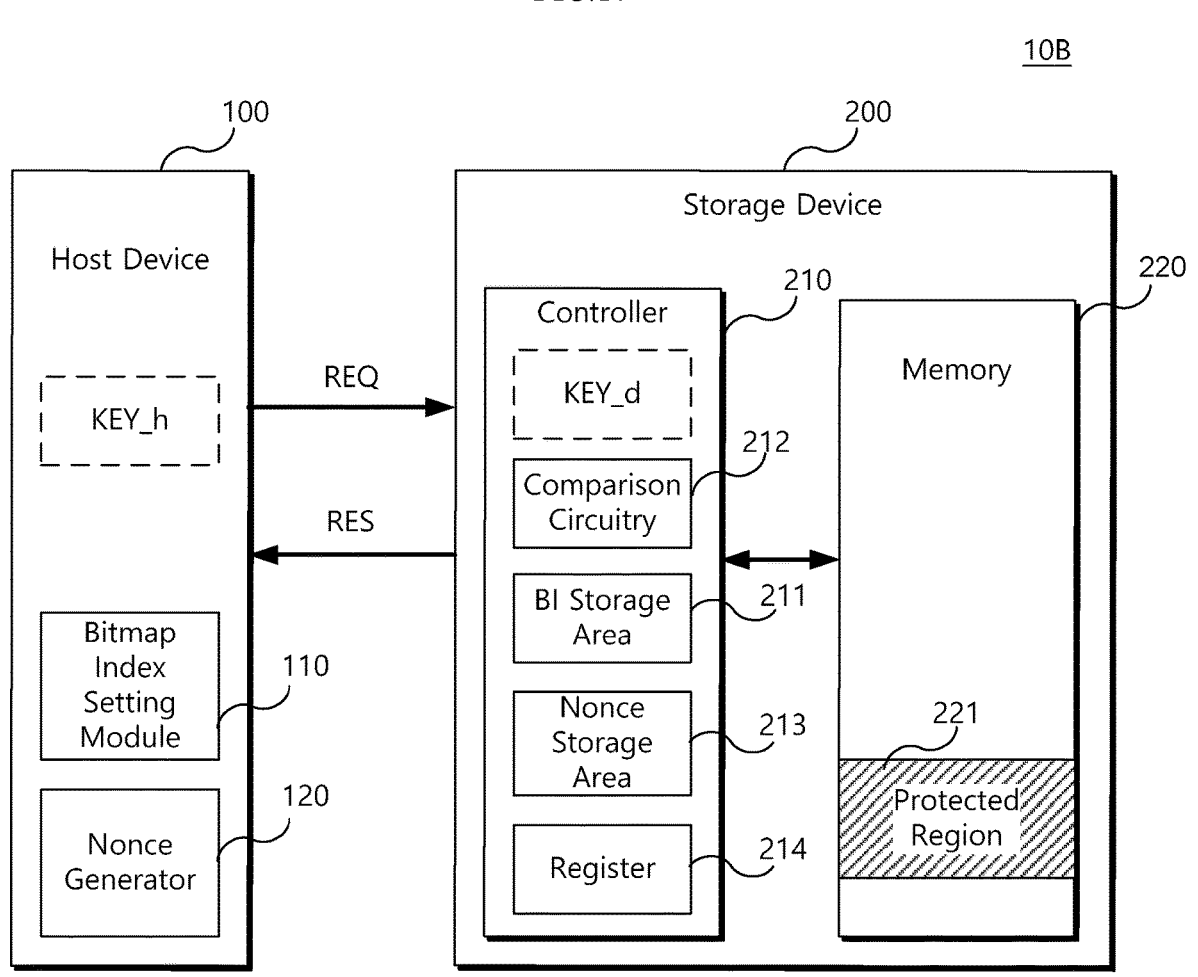
FIG. 10 is a block diagram illustrating a storage system according to some implementations.

FIG. 10 is a block diagram illustrating a storage system 10B according to some implementations. The storage system 10B of FIG. 10 is similar to the storage system 10A of FIG. 1. Therefore, the same or similar components are denoted by the same or similar reference numerals, and redundant descriptions will be omitted below.

As compared with the storage system 10A of FIG. 1, the storage system 10B of FIG. 10 may further use a nonce and/or a writer counter to enhance security for a protected region 221. To this end, a host device 100 of the storage system 10B may further include a nonce generator 120, and a storage device 200 may further include a nonce storage area 213 and a register 214.

The nonce generator 120 may generate a nonce, a randomly generated number. The generated nonce may be included in a request REQ and transmitted to the storage device 200. In this case, nonces having different values may correspond to requests REQ issued by the host device 100, respectively.

The nonce storage area 213 may extract and store the nonce included in the request REQ. For example, the nonce storage area 213 may be implemented using a relatively small storage space and may store only nonces smaller than or equal to a predetermined number. For example, the nonce storage area 213 may be implemented to store only one nonce. In this case, a nonce processed as a failure in a previous operation may be stored in the nonce storage area 213.

According to some implementations, the storage device 200 may additionally verify the currently received request REQ based on the nonce included in the request REQ. For example, the current storage device 200 may compare the nonce stored in the nonce storage area 213 with the nonce included in the currently received request REQ, and may process the request REQ as a failure when the two nonces are the same.

The register 214 may store a write counter. For example, the controller 210 may perform a write operation in response to a write request for the protected region 221 and may count the write operation. Whenever a write request for a protected region 221 is successfully processed, the write counter stored in the register 124 may be increased by one by the storage device 200.

According to some implementations, the write counter stored in the register 214 may be provided to the host device 100. For example, the host device 100 may provide the storage device 200 with a request for reading a current write counter (for example, a write count read request). The storage device 200 may read the write counter stored in the register 214, and may provide a response including the read write counter to the host device 100.

According to some implementations, the storage device 200 may additionally verify the currently received request REQ based on the write counter. For example, the host device 100 may transmit a write request REQ to the storage device 200, and the write request REQ may include a write counter. When the write counter included in the write request REQ is different from the current write counter, for example, the write counter stored in the register 214, the storage device 200 may process the request as a failure.

As described above, the storage system 10B according to some implementations may additionally verify the currently received request REQ using a nonce and/or a write counter, as well as a bitmap index. Accordingly, security for the protected region 221 may be further enhanced.

FIG. 11 is a diagram illustrating an example of a message data frame used in the storage system 10B of FIG. 10, according to some implementations. For example, the message data frame of FIG. 11 may be a message data frame in a normal RPMB mode of a UFS. According to some implementations, the message data frame of FIG. 11 may be commonly applied to a request REQ and a response RES for access to the protected region 221 of FIG. 10.

Referring to FIG. 11, a message data frame may have a length of 512 bytes in a normal RPMB mode Stuff bytes may represent start of a message data frame. The stuff bytes may have, for example, a size of 196 bytes and may be positioned at the beginning of the message data frame.

Bitmap support may indicate whether an operation of verifying a request REQ using a bitmap index according to some implementations is supported. An operation of verifying a request REQ using a bitmap index may be referred to as a bitmap index authentication scheme. For example, when a bitmap support value is '0x0001h,' a bitmap index authentication scheme according to some implementations may be supported. For example, when the bitmap support value is '0x0000h,' the bitmap index authentication scheme according to some implementations may not be supported.

A bitmap index may indicate a bitmap index according to some implementations. For example, different bitmap indexes may be set for each request REQ. For example, a bitmap index may be set to have a size of 5 bytes. However, this is only an example, and the size of the bitmap index may be variously set according to some implementations. For example, a bitmap index may be set to have at least 1 bit.

A message authentication code MAC may be included in each of a request REQ and a response RES. The message authentication code MAC may be used to verify a request REQ and/or a response RES. For example, the host device 100 may generate a message authentication code MAC to be included in a request REQ based on a message MSG and a host key KEY_h to be included in the request REQ, and the storage device 200 may verify the message authentication code MAC included in the request REQ based on a message MSG and a device key KEY_d included in the request REQ. The message to be included in the request REQ may be at least one of, for example, data, a nonce, a write counter, an address, or a block count. The message authentication code MAC may have a length of, for example, 32 bytes.

In addition, the message authentication code MAC may be used to transmit an authentication key in an authentication key programming request.

The message authentication code MAC may be generated from the authentication key and the message MSG based on a hash function. Accordingly, the message authentication code MAC may be referred to as a hash MAC (HMAC).

The data may be included in each of the request REQ and the response RES. For example, data included in the request REQ may correspond to data to be written in the storage device 200, and data included in the response RES may correspond to data read from the storage device 200.

As an example, data may have a size of 256 bytes in the normal RPMB mode. As another example, data may have a size of 4096 bytes in an advanced RPMB mode.

The nonce may be included in each of the request REQ and the response RES, and may include a random number generated by the host device 100. The nonce may have a size of, for example, 16 bytes.

The write counter may be included in each of the request REQ and response RES, and may include a value obtained by counting write operations on the protected region 221. According to some implementations, the write counter may be used to verify the request REQ and the response RES together with a bitmap index and a message authentication code MAC. The write counter may have a size of, for example, 4 bytes.

The address may be included in each of the request REQ and the response RES, and may include a value indicating an area in or from data is to be written or read in the protected region 221. The address may have a size of, for example, 2 bytes.

The block count may be included in each of the request REQ and response RES, and may include a number of logical blocks requested to be read or programmed. The block count may have a size of, for example, 2 bytes.

The result may be included in the response RES, and may include a value representing a result of operation. The result may have a size of, for example, 2 bytes.

A message type Req./Resp. may be included in each of the requests REQ and the responses RES. The message type Req./Resp. included in the request REQ may be referred to as a request message type and may have a value defining a request. For example, the request message type may include a value indicating a single request, among an authentication key programming request, a write count read request, an authenticated data write request, an authenticated data read request, a result read request, a secure write protect configuration block write request, or a secure write protect configuration block read request.

The message type Req./Resp. included in the response RES may be referred to as a response message type and may have a value defining a response. For example, the response message type may include a value indicating a single response, among an authentication key programming response, a write counter read response, an authenticated data write response, an authenticated data read response, a secure write protect configuration block write response, or a secure write protect configuration block read response.

FIGS. 12A-12B are diagrams illustrating an example of a request REQ and a response RES used in the storage system 10B of FIG. 10 when an authenticated data write operation is performed in a normal RPMB mode, according to some implementations. In detail, FIG. 12A illustrates an example of an authenticated data write request, and FIG. 12B illustrates an example of a result read response thereto. The request and response of FIGS. 12A and 12B are similar to the message data frame of FIG. 11. Therefore, redundant descriptions will be omitted below.

Referring to FIG. 12A, when an authenticated data write operation is performed in the normal RPMB mode, the request REQ issued by the host device 100 may include bitmap support, a bitmap index, a message authentication code MAC, data, a nonce, a write counter, an address, a block count, and a message type Req./Resp.

The bitmap support may be set using a bitmap index flag. For example, when the bitmap index flag of the bitmap support is set to a specific value, a bitmap index authentication scheme according to some implementations may be supported. As an example, when bitmap support is set to '0x0001h,' the bitmap index authentication scheme according to some implementations may be supported. As another example, when bitmap support is set to '0x0000h,' the bitmap index authentication scheme according to some implementations may not be supported.

The bitmap index is set by the host device 100, and may be provided to the storage device 200.

The message authentication code MAC may be referred to as a host message authentication code, and may be generated based on a host key KEY_h. For example, the message authentication code MAC may be generated based on the host key KEY_h and at least one of contents (for example, bitmap support, a bitmap index, data, a nonce, a write counter, an address, and a block count) included in a message data frame of the request REQ. As an example, the message authentication code MAC may be generated based on the host key KEY_h, bitmap support, a bitmap index, data, a block count, a write counter, a message type, or an address. As another example, the message authentication code MAC may be generated based on the host key KEY_h, data, a block count, a write counter, a message type, or an address.

The bitmap support, the bitmap index, the message authentication code, the data, the nonce, the write counter, the address, the block counter, and the message type may be included in the request REQ and transmitted from the host device 100 to the storage device 200.

Referring to FIG. 12B, when an authenticated data write operation is performed in the normal RPMB mode, the response RES issued by the storage device 200 may include bitmap support, a bitmap index, a message authentication code MAC, a nonce, a write counter, an address, a result, and a message type Req./Resp.

The message authentication code MAC may be referred to as a device message authentication code, and may be generated based on a device key KEY_d. For example, the message authentication code MAC may be generated based on the device key KEY_d and at least one of contents (for example, bitmap support, a bitmap index, a nonce, a write counter, and an address) included in a message data frame of the response RES.

The nonce may be set to the same value as a value received from the host device 100, and the write counter may be set to a value the same as or different from the value received from the host device 100. For example, when the request REQ received from the host device 100 is successfully processed, the storage device 200 may increase a value of the write counter by '1' and may transmit the increased value of the write counter to the host device 100 after including the increased value of the write counter in the response RES.

The bitmap support, the bitmap index, the message authentication code, the nonce, the write counter, the address, the message type, and the result may be included in the response RES and transmitted from the storage device 200 to the host device 100.

For ease of description, in FIGS. 12A and 12B, the request REQ and the response RES have been described as including a single RPMB message data frame. However, this is only an example, and the request REQ and response RES may include a plurality of RPMB message data frames.

FIGS. 13A-13B include diagrams, each illustrating an example of the request REQ and the response RES used in the storage system 10B of FIG. 10 when a secure write protect configuration block write operation is performed in a normal RPMB mode, according to some implementations.

In detail, FIG. 13A illustrates an example of a secure write protect configuration block write request, and FIG. 13B illustrates an example of a result read response thereto. The request and response of FIGS. 13A and 13B are similar to those of FIGS. 11, 12A and 12B. Therefore, redundant descriptions will be omitted below.

The storage system 10B according to some implementations may use a bitmap index authentication scheme when performing a secure write protect configuration block write operation in the normal RPMB mode. The secure write protect configuration block write operation may be performed on only a predetermined RPMB region. For example, a zeroth RPMB region RPMB region 0 may be set as a secure write protect configuration block. In this case, a secure write protect configuration block write request may be issued for only the zeroth RPMB region. When the request is successfully processed, components of the secure write protection configuration block may be updated.

Referring to FIG. 13A, when a secure write protect configuration block write operation is performed in the normal RPMB mode, the request REQ issued by the host device 100 may include bitmap support, a bitmap index, a message authentication code mac, data, a nonce, a write counter, an address, a block count, and a message type Req./Resp.

The bitmap support may be set using a bitmap index flag, and the bitmap index may be set by the host device 100 and provided to the storage device 200.

The message authentication code MAC may be referred to as a host message authentication code, and may be generated based on a host key KEY_h. For example, the message authentication code MAC may be generated based on the host key KEY_h and at least one of the contents (for example, bitmap support, a bitmap index, data, a nonce, a write counter, an address, and a block count) included in the message data frame of the request REQ. As an example, the message authentication code MAC may be generated based on the host key KEY_h, bitmap support, a bitmap index, data, a block count, a write counter, a message type, and an address. As another example, the message authentication code MAC may be generated based on the host key KEY_h, bitmap support, a bitmap index, data, a block count, a write counter, and a message type. As another example, the message authentication code MAC may be generated based on the host key KEY_h, data, a block count, a write counter, a message type, and an address.

The data may include information to be stored in the secure write protect configuration block. For example, the data may include information on LUN, DATA LENGTH, and secure write protect entries.

The bitmap support, the bitmap index, the message authentication code, the data, the nonce, the write counter, the block counter, and the message type may be included in the request REQ and then transmitted from the host device 100 to the storage device 200.

Referring to FIG. 13B, when a secure write protect configuration block write operation is performed in the normal RPMB mode, the response RES issued by the storage device 200 may include bitmap support, a bitmap index, a message authentication code MAC, a nonce, a write counter, a result, and a message type Req./Resp.

The bitmap support, the bitmap index, the message authentication code, the nonce, the write counter, the message type, and the result may be included in the response RES and then transmitted from the storage device 200 to the host device 100.

Figures 14, 15:
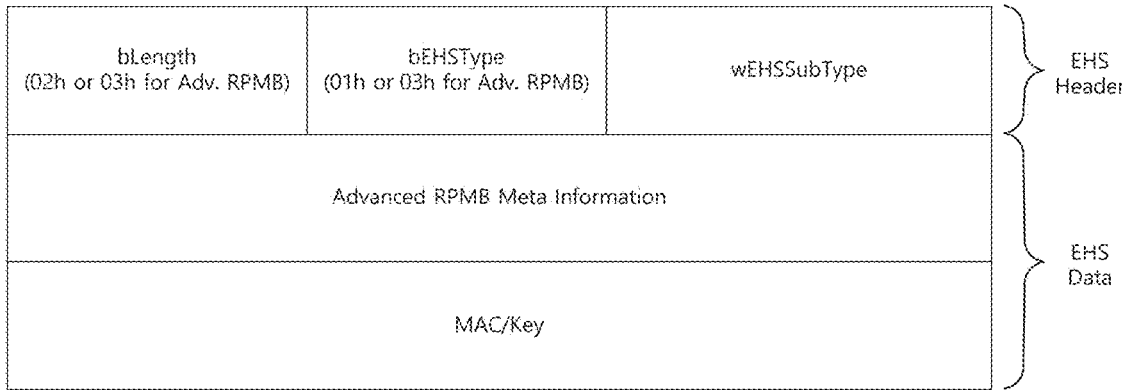
FIG. 14 is a diagram illustrating an example of a request and a response when the storage system of FIG. 10 supports an advanced RPMB mode, according to some implementations.
FIG. 15 is a diagram illustrating an EHS field in the advanced RPMB mode, according to some implementations.

FIG. 14 is a diagram illustrating an example of a request and a response when the storage system 10B of FIG. 10 supports an advanced RPMB mode, according to some implementations, and FIG. 15 is a diagram illustrating an EHS field in the advanced RPMB mode, according to some implementations.

Referring to FIG. 14, the memory system 10B according to some implementations may support an advanced RPMB mode. In this case, communication between the host device 100 and the storage device 200 may be performed through a command UFS protocol information unit (UPIU) and a response UPIU, and each of the command UPIU and the response UPIU may be provided with an extra head segment (EHS) field. The command UPIU may correspond to a request REQ issued by the host device 100 of FIG. 10, and the response UPIU may correspond to a response RES issued by the storage device 200 of FIG. 10.

Referring to FIG. 15, the command UPIU or the response UPIU may include an EHS field. The advanced RPMB message structure in the EHS field may include an EHS header and EHS data. The EHS header may include bLength and bEHSType, and the EHS data may include advanced RPMB meta information and a message authentication code.

The advanced RPMB meta information may include information on a request/response message type, a nonce, a write counter, an address or LUN, a block count, and a result. According to some implementations, the advanced RPMB meta information may additionally include information on bitmap support and a bitmap index.

The bLenght indicates a total size of the EHS header and EHS data, and a value of the bLenght may be '02h' or '03h.' As an example, when a bitmap index authentication scheme according to some implementations is supported, the value of bLenght may be '03h.' As another example, when the bitmap index authentication scheme according to some implementations is not supported, the value of the bLenght may be '02h.'

FIGS. 16A-16B include diagrams, each illustrating an example of a request REQ and a response RES used in the storage system 10B of FIG. 10 when an authenticated data write operation is performed in the advanced RPMB mode, according to some implementations. In detail, FIG. 16A illustrates an example of a command UPIU, and FIG. 16B illustrates an example of a response UPIU. The request and response of FIGS. 16A and 16B are similar to those of FIGS. 11 and 12A-12B. Therefore, redundant descriptions will be omitted below.

Referring to FIG. 16A, when an authenticated data write operation is performed in the advanced RPMB mode, a command UPIU issued by the host device 100 may include a total EHS length and an EHS field.

The total EHS length may be set depending on whether a bitmap index authentication scheme according to some implementations is supported. For example, when the bitmap index scheme according to some implementations is not supported, the entire EHS length may be set to '02h.' For example, when the bitmap index scheme according to some implementations is supported, the entire EHS length may be set to '03h,' as illustrated in FIG. 16A.

The EHS fields of the command UPIU may include an EHS header, a message type Req./Resp., a nonce, a writer counter, an address/LUN, a block count, a message authentication code MAC, a bitmap index, and bitmap support.

Referring to FIG. 16B, when an authenticated data write operation is performed in the advanced RPMB mode, a response UPIU issued by the storage device 200 may include an EHS field, and the EHS field of the response UPIU may include an EHS header, a message type Req./Resp., a nonce, a write counter, an address/LUN, a result, a message authentication code MAC, a bitmap index, and bitmap support.

FIGS. 17A-17B include diagrams, each illustrating an example of a request REQ and a response RES used in the storage system 10B of FIG. 10 when a secure write protect configuration block write operation is performed in the advanced RPMB mode, according to some implementations. In detail, FIG. 17A illustrates an example of a command UPIU, and FIG. 17B illustrates an example of a response UPIU. The request and response of FIGS. 17A and 17B are similar to those of FIGS. 11, 12, 13 and 14. Therefore, redundant descriptions will be omitted below.

The storage system 10B according to some implementations may use a bitmap index authentication scheme when performing a secure write protect configuration block write operation in the advanced RPMB mode. A secure write protect configuration block write operation may be performed on only a predetermined RPMB region.

Referring to FIG. 17A, when a secure write protect configuration block write operation is performed in the advanced RPMB mode, a command UPIU issued by the host device 100 may include a total EHS length and an EHS field. In the case in which a bitmap index authentication scheme according to some implementations is supported, the total EHS length may be set to, for example, '03h.'

The EHS field of the command UPIU may include an EHS header, a message type Req./Resp., a nonce, a writer counter, a block count, a message authentication code MAC, a bitmap index, and bitmap support.

Referring to FIG. 17B, when a secure write protect configuration block write operation is performed in the advanced RPMB mode, a response UPIU issued by the storage device 200 includes an EHS field, and the EHS field of the response UPIU may include an EHS header, a message type Req./Resp., a nonce, a writer counter, a result, a message authentication code MAC, a bitmap index, and bitmap support.

As described above in FIGS. 10 to 17B, the storage system 10B according to some implementations may support a normal RPMB mode and an advanced RPMB mode, and may perform a data write operation and a security write protect configuration block write operation, respectively authenticated in the normal RPMB mode and the advance RPMB mode. In this case, the storage system 10B according to some implementations may indicate whether a bitmap authentication scheme is supported through bitmap support. When the bitmap authentication scheme according to some implementations is supported, the storage system 10B may additionally verify a request REQ issued by the host device 100 through the bitmap index.

It will be appreciated that the message data frame or the EHS field described in FIGS. 11 to 17B is merely exemplary, and some implementations are not limited thereto. The size and configuration of the message data frame or EHS field may vary according to some implementations.

In addition, the storage system 10B according to some implementations may verify the request REQ issued by the host device 100, using the message data frame or the EHS field described in FIGS. 11 to 17B, by various methods. Hereinafter, some implementations of the operating method will be described in more detail.

Figure 18:
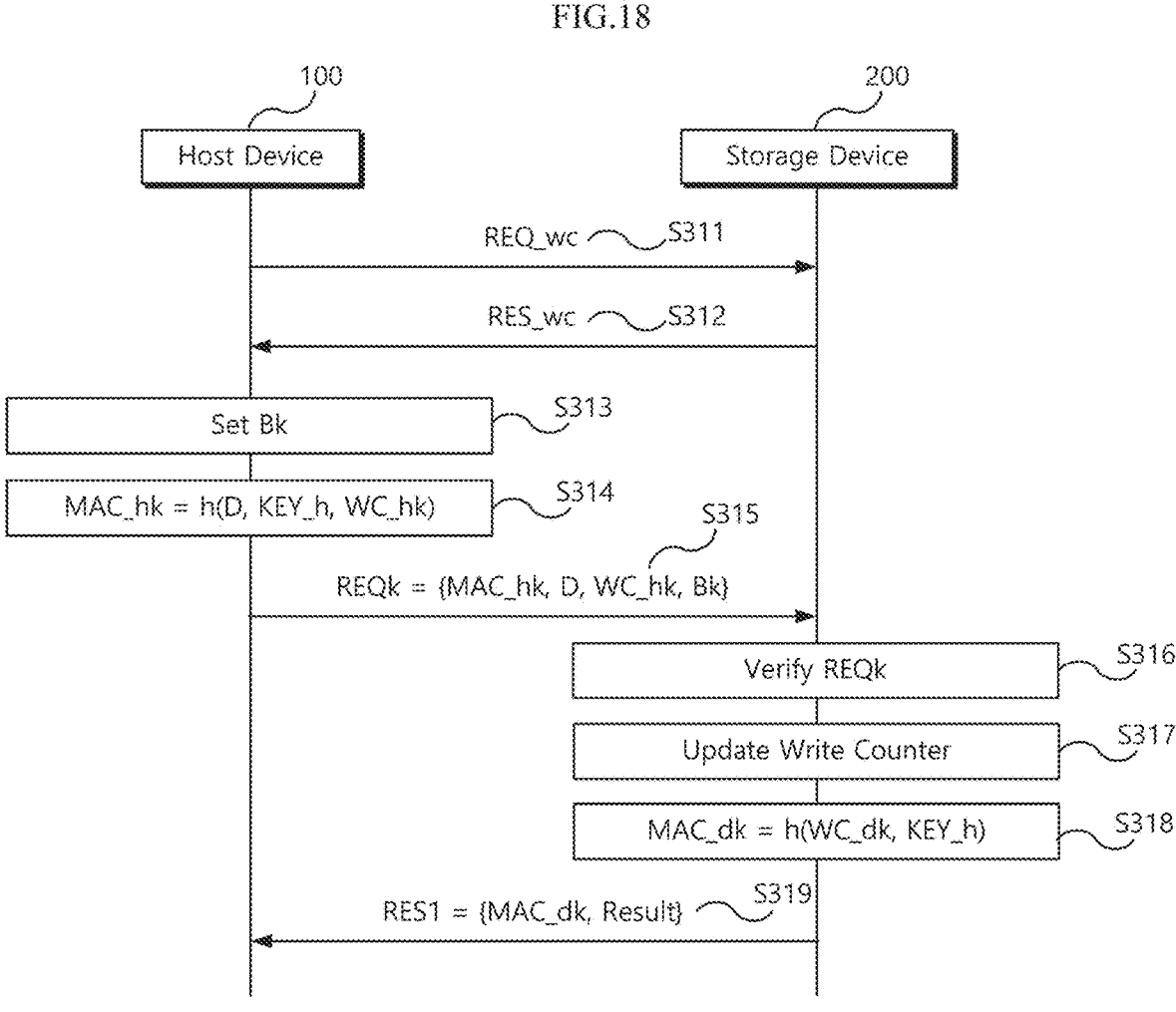
FIG. 18 is a flowchart illustrating an example of a method for the storage system of FIG. 10 to verify a request issued by the host device, according to some implementations.

FIG. 18 is a flowchart illustrating an example of a method for the storage system 10B of FIG. 10 to verify a request issued by the host device 100, according to some implementations. For ease of description, in FIG. 18, an example is provided where a request currently received by the storage device 200 is a k-th request REQk and the k-th request REQk includes a message authentication code MAC_hk, data Dk, a write counter WC_hk, and a bitmap index Bk. The operation method of FIG. 18 is similar to the operation method of FIG. 8. Therefore, redundant descriptions will be omitted below.

Referring to FIG. 18, in operation S311, the host device 100 may provide a write counter read request REQ_wc to the storage device 200.

In operation S312, the storage device 200 may provide a write counter read response RES_wc to the host device 100. The host device 100 may extract a device write counter WC_dk from a write counter read response RES_wc and set the extracted device write counter WC_dk as the host write counter WC_hk.

In operation S313, the host device 100 may generate a bitmap index Bk.

In operation S314, the host device 100 may generate a host message authentication code MAC_hk based on the data D, the host key KEY_h, and the host write counter WC_hk.

In operation S315, the host device 100 may issue a write request REQk. The write request REQk may include a host message authentication code MAC_hk, data D, a host write counter WC_hk, and a bitmap index Bk.

In operation S316, the storage device 200 may receive and verify the write request REQk. For example, the storage device 200 may verify the write request REQk based on a currently received bitmap index Bk and bitmap indexes stored in the bitmap index storage area 211. The storage device 200 may additionally verify the write request REQk based on the host message authentication code MAC_hk. The storage device 200 may additionally verify the write request REQk based on the host write counter WC_hk.

In operation S317, the storage device 200 may update the device write counter WC_dk. For example, the storage device 200 may update the device write counter WC_dk based on a result of verifying the write request REQk. Accordingly, the device write counter WC_dk may be maintained or changed.

In operation S318, the storage device 200 may generate a device message authentication code MAC_dk. The storage device 200 may generate the device message authentication code MAC_dk based on the device write counter WC_dk and the device key KEY_d. The device write counter WC_dk, used to generate the device message authentication code MAC_dk, may have a value updated in operation S317.

In operation S319, the storage device 200 may issue a response RESk. The response RESk may include a result Result of success or failure for the device message authentication code MAC_dk and write request REQk.

Figure 19:
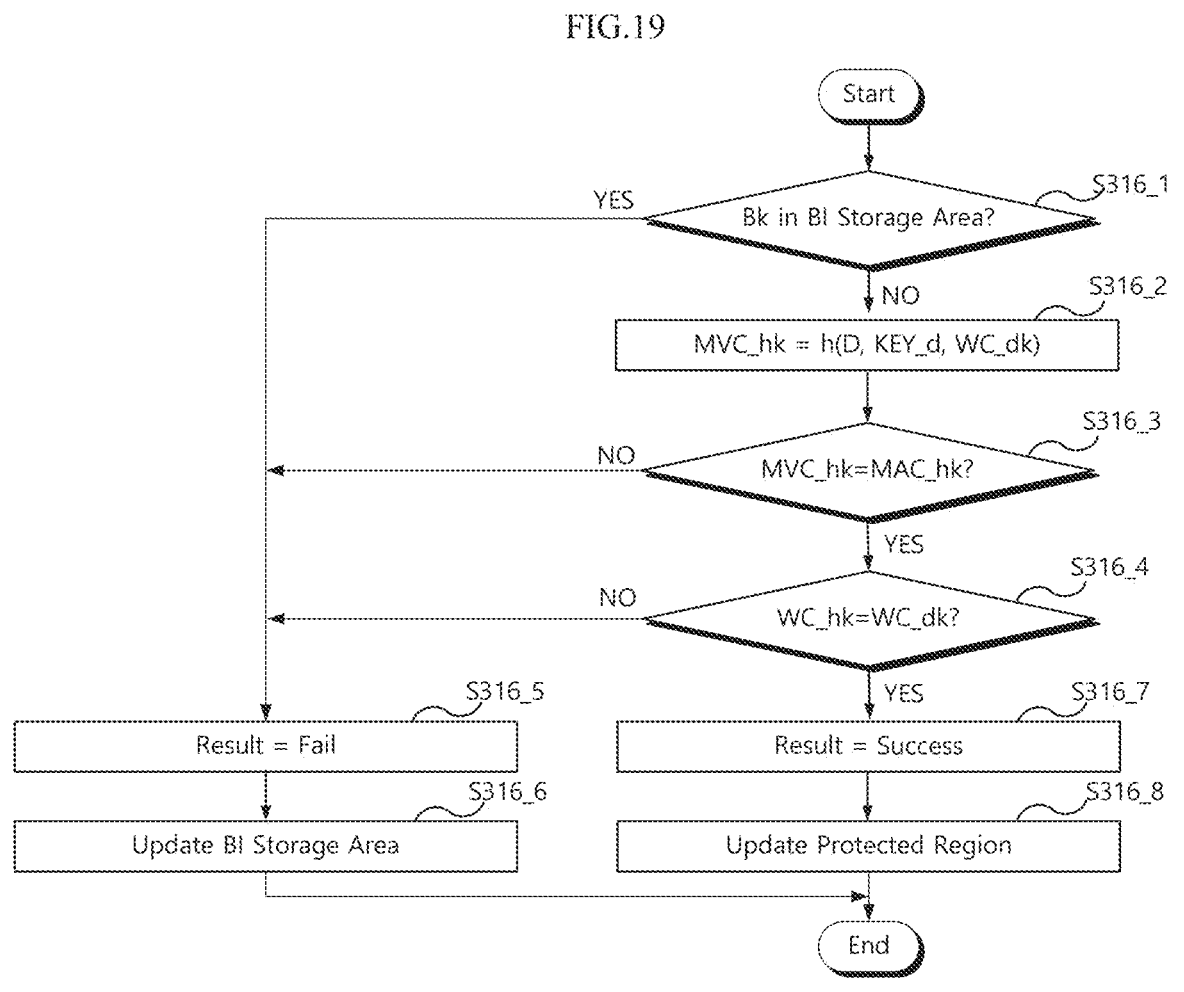

FIG. 19 is a flowchart illustrating an example of operation S316 of FIG. 18 in more detail, according to some implementations. The operation method of FIG. 19 is similar to the operation method of FIG. 4. Therefore, redundant descriptions will be omitted below.

In operation S316_1, a check may be made as to whether a currently received bitmap index Bk is the same as one of previously received bitmap indexes. For example, the storage device 200 may check whether, among the bitmap indexes stored in the bitmap index storage area 211 (see FIG. 10), the same bitmap index as the currently received bitmap index Bk is present.

When the same bitmap index is present, the flow may proceed to operation S316_5 in which a currently received request REQk is processed as a failure. When the same bitmap index is absent, the flow may proceed to operation S316_2 in which additional authentication is performed.

In operation S316_2, a message verification code MVC_hk may be generated. For example, the storage device 200 may extract the data Dk from the currently received request REQk, and may calculate the message verification code MVC_hk using a device key KEY_d stored in the storage device 200 and a device write counter WC_dk.

In operation S316_3, a determination may be made as to whether the calculated message verification code MVC_hk matches the host message verification code MAC_hk included in the currently received request REQk.

When the message verification code MVC_hk does not match the host message verification code MAC_hk, the flow may proceed to operation S316_5 in which the currently received request REQk is processed as a failure. When the message verification code MVC_hk matches the host message verification code MAC_hk, the flow may proceed to operation S316_4 in which additional authentication is performed.

In operation S316_4, a determination may be made as to whether the host write counter WC_hk is the same as a device write counter WC_ah. For example, the storage device 200 may extract the host write counter WC_hk from the currently received request REQk and may compare the extracted host write counter WC_hk with the device write counter WC_dk stored in the register 214 (see FIG. 10).

When the host write counter WC_hk and the device write counter WC_dk do not match each other, the flow may proceed to operation S316_5 in which the currently received request REQk is processed as a failure. When the host write counter WC_hk and the device write counter WC_dk match each other, the flow may proceed to operation S316_7 in which the currently received request REQk is processed as a success.

In operation S316_5, the currently received request REQk may be processed as a failure. In this case, in operation S316_6, bitmap indexes stored in the bitmap index storage area 211 may be updated.

In operation S316_7, the currently received request REQk may be processed as a success. In this case, in operation S316_8, the data Dk included in the currently received request REQk may be written in the protected region 221 (see FIG. 10).

Figure 20:
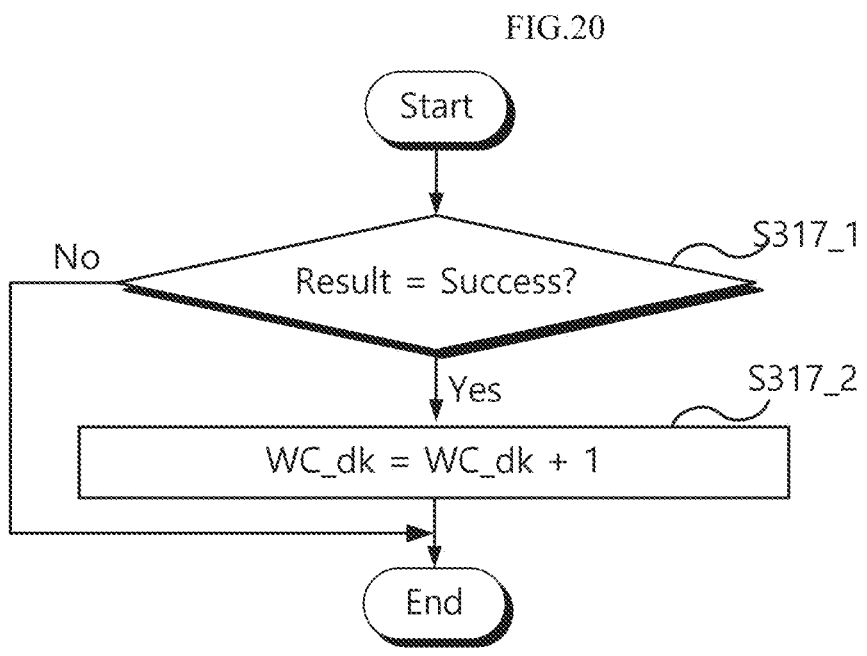
FIG. 20 is a flowchart illustrating an example of operation S317 of FIG. 18 in more detail, according to some implementations.

FIG. 20 is a flowchart illustrating an example of operation S317 of FIG. 18 in more detail, according to some implementations.

In operation S317_1, a result of processing the write request REQk may be identified. As an example, when verification of the write request REQk is successful, the storage device 200 may set the result to a value corresponding to the success. As another example, when verification of the write request REQk fails, the storage device 200 may set the result to a value corresponding to the failure.

In operation S317_2, when the verification of the write request REQk is successful, the device write counter WC_dk may be increased. For example, the storage device 200 may increase the device write counter WC_dk by 1, and may store the increased device write counter in the register 214 (see FIG. 10).

As described with reference to FIGS. 18 to 20, the storage system 10B according to some implementations may not only verify the currently received request REQ based on the bitmap index and message authentication code, but also additionally verify the currently received request REQ based on the write counter. Accordingly, security for the protected region 221 may be further enhanced.

It will be appreciated that the above description is merely exemplary and some implementations are not limited thereto. For example, in FIG. 19, a bitmap index, a message authentication code, and a write counter have been described as being sequentially used to verify a currently received request. However, this is only an example, and the order of verify operations using the bitmap index, the message authentication code, and the write counter may be variously adjusted according to some implementations.

Figure 21:
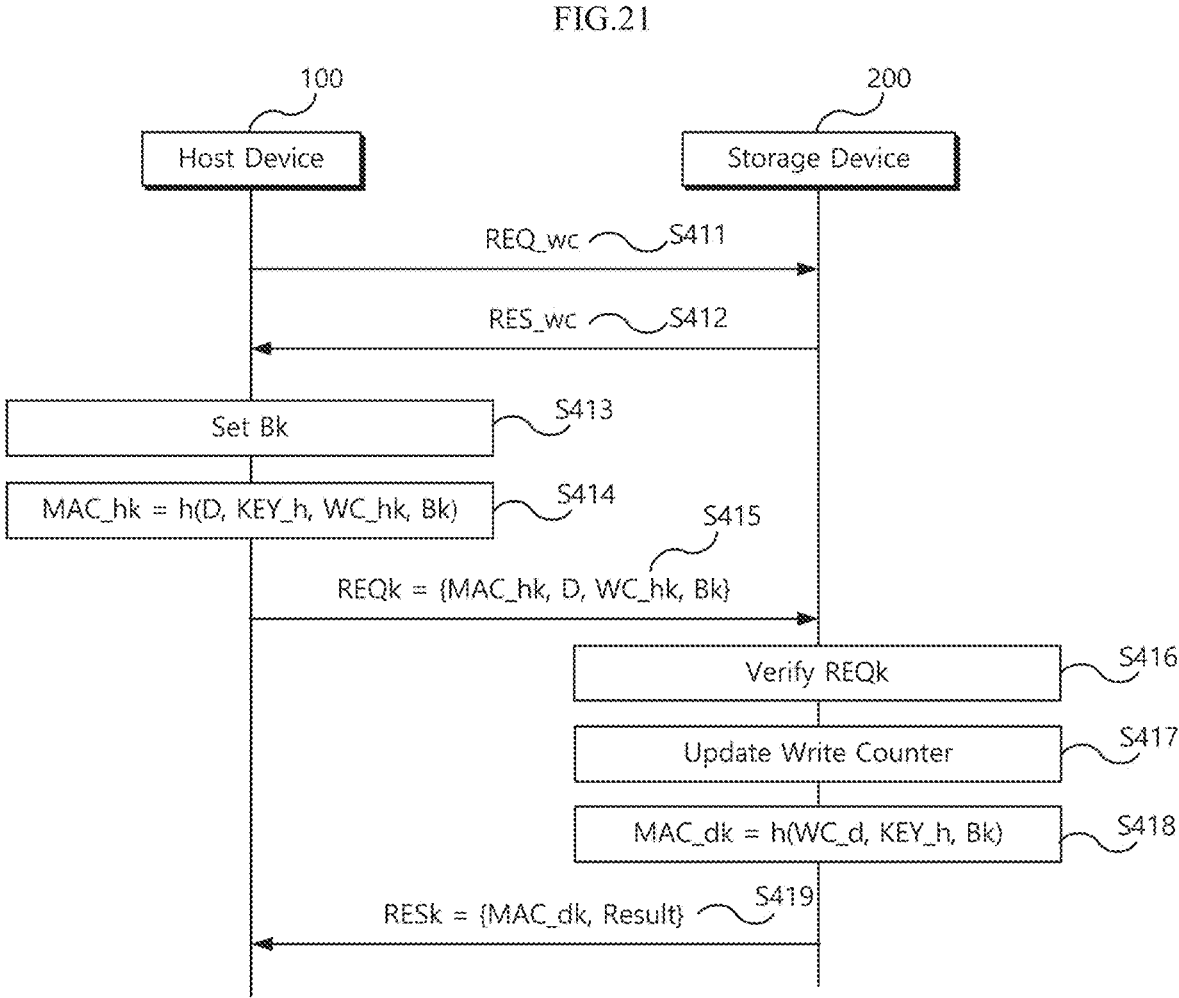
FIG. 21 is a diagram illustrating an example of a method for the storage system of FIG. 10 to verify a write request issued by the host device, according to some implementations.

FIG. 21 is a diagram illustrating an example of a method for the storage system 10B of FIG. 10 to verify a write request issued by the host device 100, according to some implementations. The operation method of FIG. 21 is similar to the operation method of FIG. 18. Therefore, the same or similar components are denoted by the same or similar reference numerals, and redundant descriptions will be omitted below.

Unlike the description provided in FIG. 18, the storage system 10B according to some implementations may additionally use a bitmap index when generating a message authentication code.

In more detail, in operation S411, the host device 100 may provide a write counter read request REQ_wc to the storage device 200.

In S412, the storage device 200 may provide a write counter read response RES_wc to the host device 100. The host device 100 may set the host write counter WC_hk to a device write counter WC_dk included in the write counter read response RES_wc.

In operation S413, the host device 100 may generate a bitmap index Bk.

In operation S414, the host device 100 may generate a host message authentication code MAC_hk based on the data D, the host key KEY_h, the host write counter WC_hk, and the bitmap index Bk.

In operation S415, the host device 100 may issue a write request REQk. The write request REQk may include the host message authentication code MAC_hk, the data D, the host write counter WC_hk, and the bitmap index Bk.

In operation S416, the storage device 200 may receive and verify the write request REQk.

In operation S417, the storage device 200 may update the device write counter WC_dk.

In operation S418, the storage device 200 may generate a device message authentication code MAC_dk. The storage device 200 may generate the device message authentication code MAC_dk based on the device write counter WC_dk, the device key KEY_d, and the bitmap index Bk.

In operation S419, the storage device 200 may issue a response RESk. The response RESk may include a result Result of success or failure for the device message authentication code MAC_dk and the write request REQk.

As described above, the storage system 10B according to some implementations may additionally use a bitmap index when generating a message authentication code.

Figure 22:
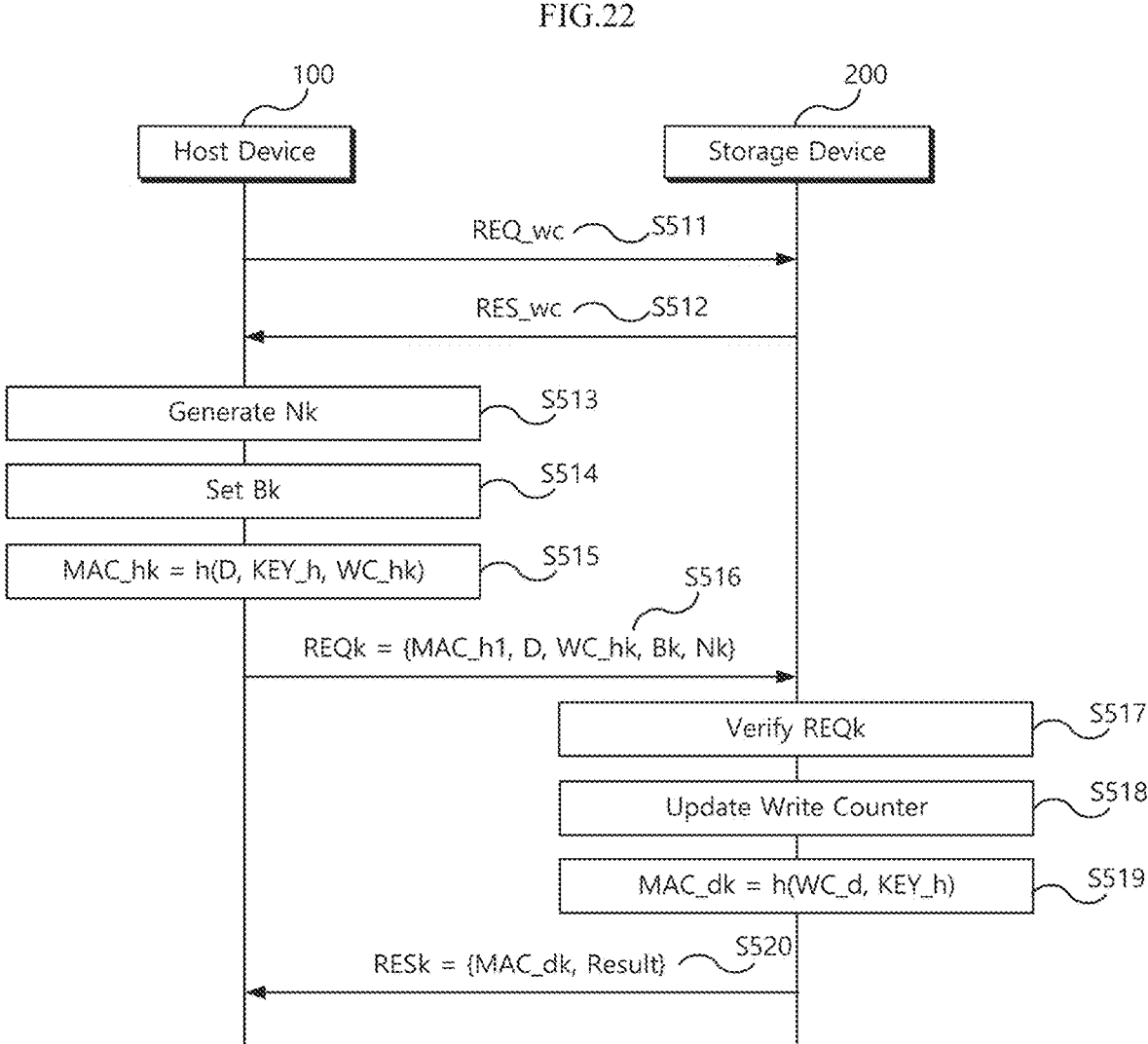
FIG. 22 is a diagram illustrating an example of a method for the storage system of FIG. 10 to verify a write request issued by the host device, according to some implementations.

FIG. 22 is a diagram illustrating an example of a method for the storage system 10B of FIG. 10 to verify a write request issued by the host device 100, according to some implementations. The operation method of FIG. 22 is similar to the operation method of FIGS. 18 and 21. Therefore, the same or similar components are denoted by the same or similar reference numerals, and redundant descriptions will be omitted below.

Unlike the descriptions provided in FIGS. 18 and 21, the storage system 10B according to some implementations may additionally use a nonce, a random number generated by the host device 100, when verifying a write request.

In more detail, in operation S511, the host device 100 may provide a write counter read request REQ_wc to the storage device 200.

In S512, the storage device 200 may provide a write counter read response RES_wc to the host device 100. The host device 100 may set the host write counter WC_hk to the device write counter WC_dk included in the write counter read response RES_wc.

In operation S513, the host device 100 may generate a nonce Nk.

In operation S514, the host device 100 may generate a bitmap index Bk.

In operation S515, the host device 100 may generate a host message authentication code MAC_hk based on the data D, the host key KEY_h, and the host write counter WC_hk.

In operation S516, the host device 100 may issue a write request REQk. The write request REQk may include a host message authentication code MAC_hk, data D, a host write counter WC_hk, a bitmap index Bk, and a nonce Nk.

In operation S517, the storage device 200 may receive and verify the write request REQk. For example, the storage device 200 may verify the write request REQk based on a currently received nonce Nk and a nonce Nk-1 stored in the nonce storage area 213 (see FIG. 10). Also, the storage device 200 may additionally verify the write request REQk based on the bitmap index Bk and the bitmap indexes stored in the bitmap index storage area 211. Also, the storage device 200 may verify the write request REQk based on a currently received bitmap index Bk and the bitmap indexes stored in the bitmap index storage area 211. Also, the storage device 200 may additionally verify the write request REQk based on the host message authentication code MAC_hk. Also, the storage device 200 may additionally verify the write request REQk based on the host write counter WC_hk.

In operation S518, the storage device 200 may update the device write counter WC_dk.

In operation S519, the storage device 200 may generate a device message authentication code MAC_dk. The storage device 200 may generate a device message authentication code MAC_dk based on the device write counter WC_dk and the device key KEY_d.

In operation S520, the storage device 200 may issue a response RESk. The response RESk may include a result Result of success or failure for the device message authentication code MAC_dk and the write request REQk.

Figure 23:
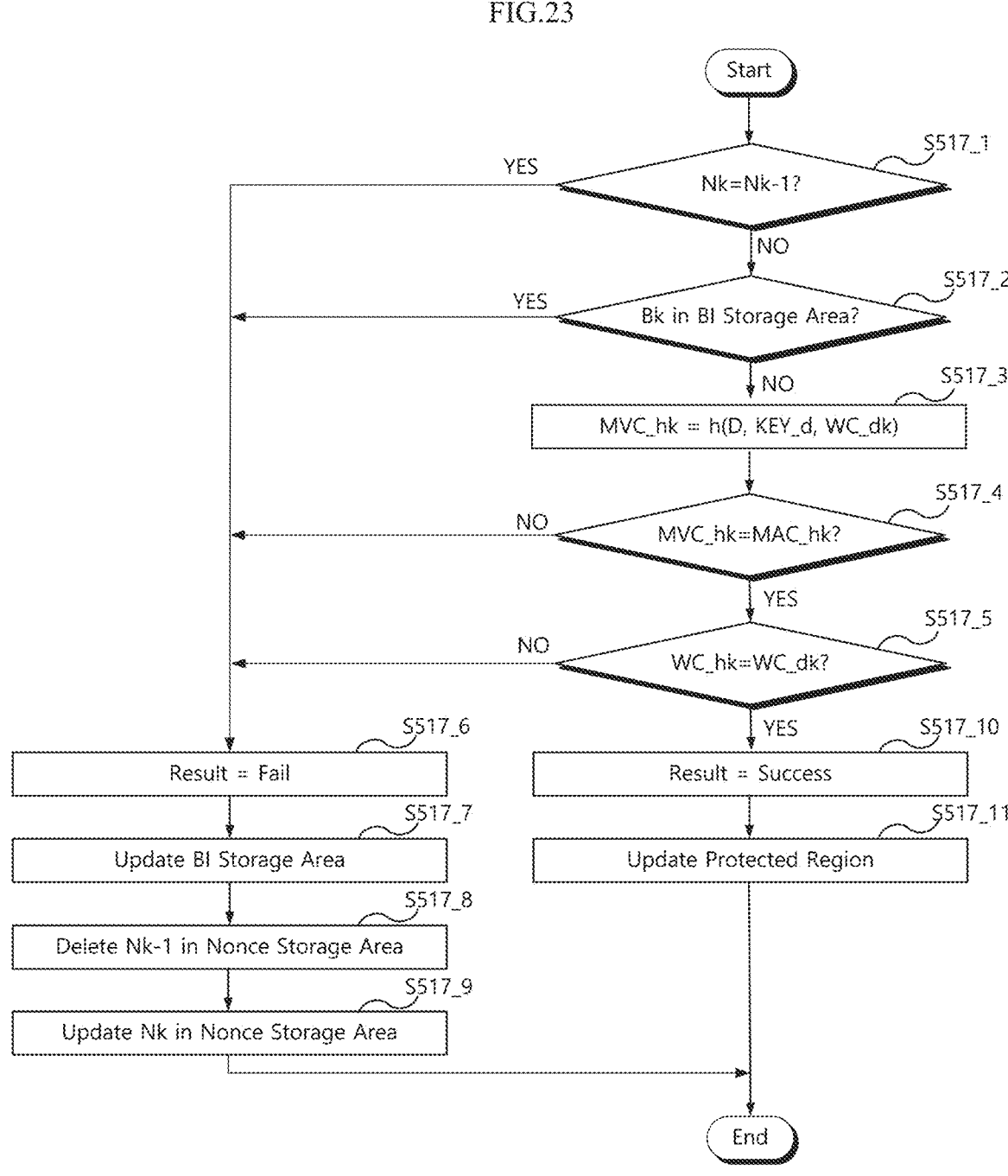
FIG. 23 is a flowchart illustrating an example of operation S517 of FIG. 23 in more detail, according to some implementations.

FIG. 23 is a flowchart illustrating an example of operation S517 of FIG. 23 in more detail, according to some implementations. The operation method of FIG. 23 is similar to the operation method of FIG. 19. Therefore, redundant descriptions will be omitted below.

In operation S517_1, a determination may be made as to whether the currently received nonce Nk is the same as the nonce Nk-1 stored in the nonce storage area 213 (see FIG. 10). A nonce Nk-1 corresponding to a write request, processed as a failure in the previous operation, may be stored in the nonce storage area 213.

When the currently received nonce Nk is the same as the nonce Nk-1 stored in the nonce storage area Nk-1, the flow may proceed to operation S517_5 in which the currently received request REQk is processed as a failure. When the currently received nonce Nk is not the same as the nonce Nk-1 stored in the nonce storage area Nk-1, the flow may proceed to operation S517_2 in which additional authentication is performed.

In operation S517_2, a check may be made as to whether the currently received bitmap index Bk is the same as one of the previously received bitmap indexes.

When the same bitmap index is present, the flow may proceed to operation S517_6 in which the currently received request REQk is processed as a failure. When the same bitmap index is absent, the flow may proceed to operation S517_3 in which additional authentication is performed.

In operation S517_3, a message verification code MVC_hk may be generated. For example, the storage device 200 may extract data Dk from the currently received request REQk, and may calculate the message verification code MVC_hk using the device key KEY_d and the device write counter WC_dk stored in the storage device 200.

In operation S517_4, a determination may be made as to whether the calculated message verification code MVC_hk matches the host message verification code MAC_hk included in the currently received request REQk.

When the message verification code MVC_hk and the host message verification code MAC_hk do not match each other, the flow may proceed to operation S517_6 in which the currently received request REQk is processed as a failure. When the message verification code MVC_hk and the host message verification code MAC_hk match each other, the flow may proceed to operation S517_5 in which additional authentication is performed.

In operation S517_5, a determination may be made as to whether the host write counter WC_hk is the same as the device write counter WC_dk.

When the host write counter WC_hk and the device write counter WC_dk do not match each other, the flow may proceed to operation S517_6 in which the currently received request REQk is processed as a failure. When the host write counter WC_hk and the device write counter WC_dk match each other, the flow may proceed to operation S517_10 in which the currently received request REQk is processed as a success.

In operation S517_6, the currently received request REQk may be processed as a failure. In this case, in operation S517_7, bitmap indexes stored in the bitmap index storage area 211 may be updated. In operation S517_8, the nonce Nk-1 stored in the nonce storage area 213 may be deleted. In operation S517_9, the currently received nonce Nk may be updated in the nonce storage area 213.

In operation S517_10, the currently received request REQk may be processed as a success. In this case, in operation S517_11, the data Dk included in the currently received request REQk may be written in the protected region 221 (see FIG. 10).

As described in FIGS. 22 and 23, the storage system 10B according to some implementations may manage history information on a request, transmitted from the host device 100 to the storage device 200, and verify a currently received write request using a nonce as well as a bitmap index. Accordingly, security of the protected region 221 may be further enhanced.

It will be appreciated that the above description is merely exemplary and some implementations are not limited thereto. For example, in FIGS. 22 and 23, a nonce, a bitmap index, a message authentication code, and a write counter have been described as being sequentially used to verify a currently received request. However, this is merely exemplary, and the order of verify operations using the nonce, the bitmap index, the message authentication code, and the write counter may be variously adjusted according to some implementations. In addition, in FIGS. 22 and 23, the message authentication code has been described as being generated based on data, a write counter and a key. However, this is merely exemplary, and the message authentication code may be generated by additionally using at least one of the nonce and the bitmap index.

Figure 24:
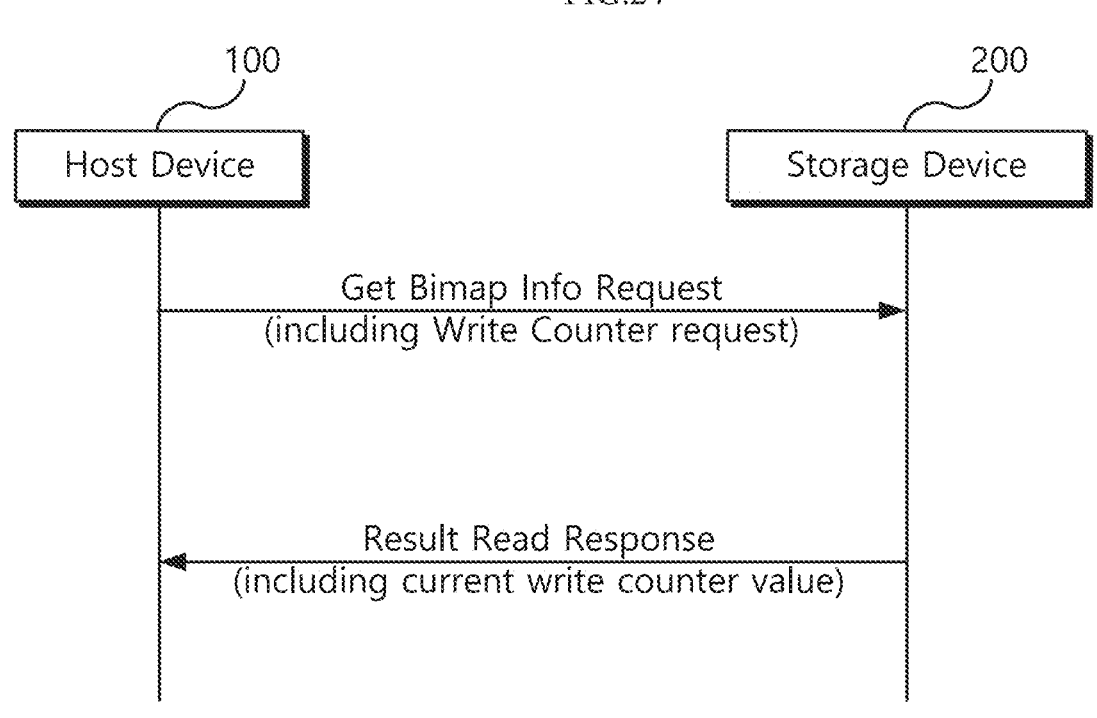
FIGS. 24 and 25 are diagrams illustrating an example of a bitmap read request of the storage system according to some implementations and a bitmap read response thereto.
Figure 25:
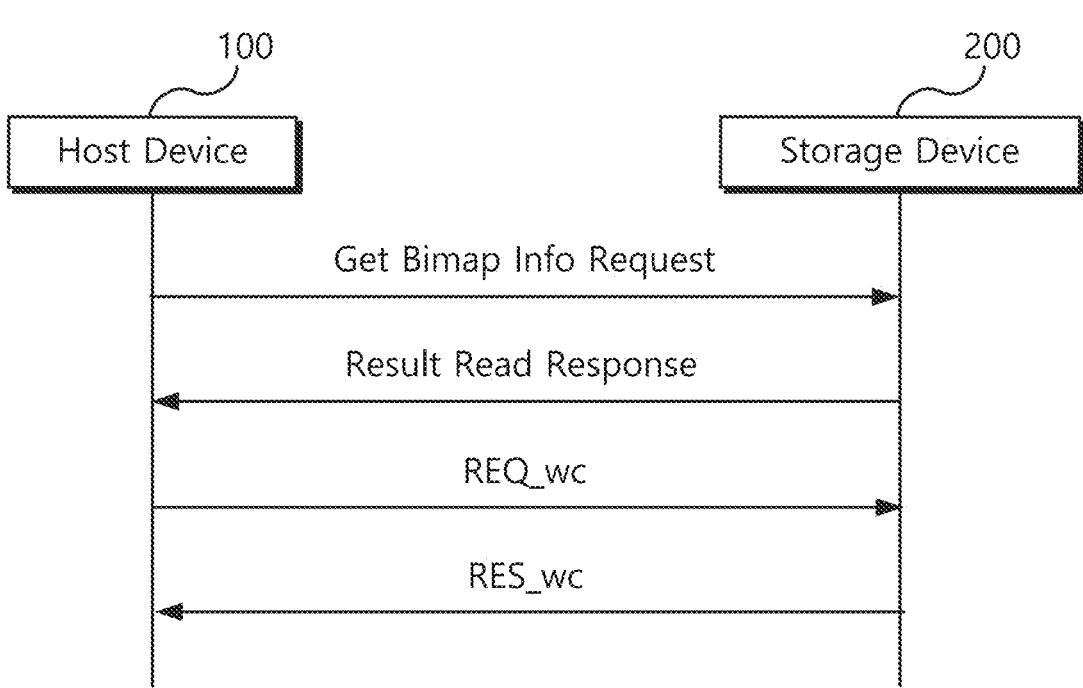

FIGS. 24 and 25 are diagrams illustrating an example of a bitmap read request of the storage system 10B according to some implementations and a bitmap read response thereto.

In some implementations, the host device 100 may transmit a bitmap read request Get Bitmap Info Request to the storage device 200. The storage device 200 may provide information on a bitmap index, stored in the bitmap index storage area 211 (see FIG. 10), to the host device 100 through a bitmap read response Read Result Response in response to the bitmap read request. Accordingly, the host device 100 may recognize not only a current state of the bitmap indexes managed in the bitmap index storage area 211, but also a maximum storable size.

According to some implementations, a bitmap read request may include the write counter read request described with reference to FIG. 21. For example, the bitmap read request may include a read request for a write counter stored in the storage device 200, as illustrated in FIG. 24. In this case, the storage device 200 may transmit not only bitmap information but also information on the write counter, as a response thereto.

In some embodiments, the bitmap read request may not include the write counter read request, as illustrated in FIG. 25. In this case, the host device 100 may transmit a bitmap read request Get Bitmap Info Request and a write counter read request REQ_wc to the storage device 200. The storage device 200 may transmit respective responses thereto to the host device 100.

In addition, in some embodiments, a bitmap read request Get Bitmap Info Request and/or a bitmap read response Read Result Response may be transmitted and received using a message authentication code MAC.

For example, the host device 100 may generate a host message authentication code MAC_h using a host key KEY_h and may transmit the bitmap read request Get Bitmap Info Request, including the host message authentication code MAC_h, to the storage device 200. The storage device 200 may generate a message verification code MVC using a device key KEY_d and may compare the message verification code MVC with the host message verification code MAC_h to verify the bitmap read request Get Bitmap Info Request.

Also, for example, the storage device 200 may generate a device message authentication code MAC_d using the device key KEY_d, and may transmit a bitmap read response Read Result Response, including the device message authentication code MAC_d, to the host device 100. The host device 100 may generate a message verification code MVC using the host key KEY_h and may compares the message verification code MVC with the device message verification code MAC_d to verify the bitmap read response Read Result Response.

Figure 26:
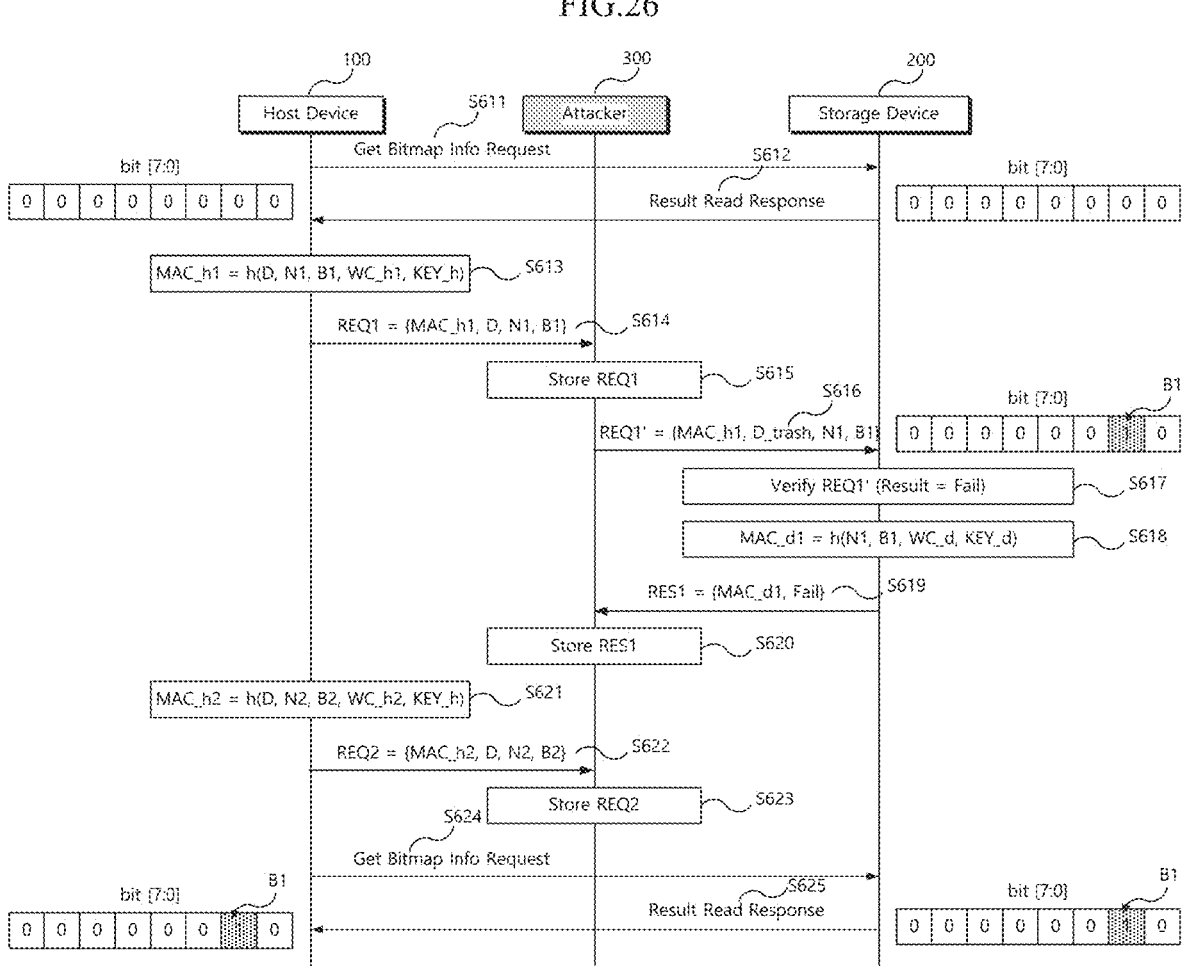
FIG. 26 is a diagram illustrating a bitmap read request of the storage system according to some implementations in more detail.

FIG. 26 is a diagram illustrating a bitmap read request of the storage system 10B according to some implementations in more detail. For ease of description, an example is provided where an attacker 300 steals a first request REQ1, a first response RES1, and a second request REQ2. Similarly to FIG. 8, an example is provided where the bitmap index storage area 211 (see FIG. 1) has a size of 8 bits and each bitmap index has a size of 1 bit.

Referring to FIG. 26, in operation S611, the host device 100 may transmit a bitmap read request Get Bitmap Info Request to the storage device 200. In this case, according to some implementations, the bitmap read request Bitmap Info Request may be generated to include a host message authentication code MAC_h.

In operation S612, the storage device 200 may transmit a response Result Read Response, including information on bitmap indexes managed in the bitmap index storage area 211 (see FIG. 10), to the host device 100. In this case, according to some implementations, the bitmap read response Result Read Response may be generated to include a message authentication code MAC_d.

For ease of description, as illustrated in FIG. 26, an example is provided where the bitmap index storage area 211 has a size of 8 bits and is empty. In this case, it may be identified that a currently maximum storable size of the host device 100 is 8 bits and no bitmap index is managed in the bitmap index storage area 211.

In operation S613, the host device 100 may generate a first bitmap index B1. The host device 100 may generate the first host message authentication code MAC_h1 based on data D, a first nonce N1, a first bitmap index B1, a first host write counter WC_h1, and a host key KEY_h.

In operation S614, the host device 100 may issue a first request REQ1. The first request REQ1 is a write request, and may include the first host message authentication code MAC_h1, the data D, the first nonce N1, and the first bitmap index B1.

In operation S615, an attacker 300 may steal and store the first request REQ1.

In operation S616, the attacker 300 may modulate the first request REQ1. For example, the attacker 300 may modulate the first request REQ1 to include trash data D_trash rather than normal data D, and may provide a modulated first request REQ1' to the storage device 200.

In operation S617, the storage device 200 may verify the modulated first request REQ1'. Since the data included in the modulated first request REQ1' is the trash data D_trash, the storage device 200 may process the request REQ1' as a failure in a verify operation using the first host message authentication code MAC_h1. Accordingly, the storage device 200 may store the first bitmap index B1, included in the currently received request REQ1', in the bitmap index storage area 211.

In operation S618, the storage device 200 may generate a first device message authentication code MAC_d1. For example, the storage device 200 may generate a first device message authentication code MAC_d1 based on the first nonce N1, the first bitmap index B1, the first device write counter WC_d1, and the device key KEY_d.

In operation S619, the storage device 200 may issue a first response RES1. The first response RES1 may include the first device message authentication code MAC_d1 and a result of failure.

In operation S620, the attacker 300 may steal and store the first response RES1.

Continuing to refer to FIG. 26, in operation S621, the host device 100 may generate a second host message authentication code MAC_h2 based on the data D, a second nonce N2, a second bitmap index B2, a second host write counter WC_h2, and a host key KEY_h.

In operation S622, the host device 100 may issue a second request REQ2. The second request REQ2 is a write request, and may include the second host message authentication code MAC_h2, the data D, the second nonce N2, and the second bitmap index B2.

In operation S623, the attacker 300 may steal and store the second request REQ2.

The attacker 300 steals the first response RES1 and the second response RES2 in operations S620 and S623, so that the host device 100 may receive no response from the storage device 200.

In operation S624, the host device 100 may transmit a bitmap read request Get Bitmap Info Request to the storage device 200.

In operation S625, the storage device 200 may transmit a bitmap result read response, including information on bitmap indexes managed in the bitmap index storage area 211 (see FIG. 10), to the host device 100.

Since a bit corresponding to the first bitmap index B1 is recorded as '1,' the host device 100 may identify that a write operation corresponding to the first request REQ1 has been processed as a failure. In addition, since there is no record in a bit corresponding to the second bitmap index B2, the host device 100 may identify that the second request REQ2 has not been transmitted to the storage device 200.

As described above, the host device 100 may recognize a current state of the bitmap indexes managed in the bitmap index storage area 211 through a bitmap index read request and a bitmap read response thereto. Accordingly, the host device 100 may check whether a request or a response has been stolen by an attacker.

FIGS. 27A-27B include diagrams, respectively illustrating an example of a bitmap read request Get Bitmap Info Request in a normal RPMB mode and an example of a bitmap read response Result Read Response in response thereto in the normal RPMB mode, according to some implementations. In detail, FIG. 27A illustrates an example of the bitmap read request in the normal RPMB mode, and FIG. 27B illustrates an example of a bitmap read response thereto in the normal RPMB mode.

Referring to FIG. 27A, a message data frame for a bitmap read request in the normal RPMB mode may include a size of bitmap, a bitmap, a message authentication code MAC, data, a nonce, a write counter, an address, a block count, a result, and a message type Req./Resp. A value of the message type Req./Resp. may be set to, for example, '000Ah.' According to some implementations, a nonce generated by the host device 100 may be transmitted.

Referring to FIG. 27B, a message data frame for a bitmap read response in the normal RPMB mode may be the same as a message data frame for the bitmap read request in the normal RPMB mode. A value of the message type Req./Resp. may be set to, for example, '0A00h.'

The size of bitmap may include information on a maximum storable bitmap size in the storage device 200. The bitmap may include information on bitmap index values managed by the storage device 200. According to some implementations, the bitmap read response may include a value for a write counter. According to some implementations, a message authentication code MAC may be generated in the storage device 200 and transmitted to the host device 100 together. In this case, the host device 100 may perform a verify operation on the bitmap read response based on the message authentication code MAC.

FIGS. 28A-28B include diagrams, respectively illustrating an example of a bitmap read request Get Bitmap Info Request in an advanced RPMB mode and a bitmap read response Result Read Response thereto in the advanced RPMB mode, according to some implementations. In detail, FIG. 28A illustrates an example of a bitmap read request in the advanced RPMB mode, and FIG. 28B illustrates an example of a bitmap read response in the advanced RPMB mode.

Referring to FIG. 28A, a command UPIU may be transmitted from the host device 100 to the storage device 200 in the advanced RPMB mode. The command UPIU of FIGS. 28A-28B may correspond to the bitmap read request.

The command UPIU may include a total EHS length. The total EHS length may be set to, for example, '03h.'

The command UPIU may include an EHS field. The EHS field may include an EHS header, a message type Req./Resp., a nonce, a writer counter, an address/LUN, a block count, a result, a message authentication code MAC, and a bitmap index. A value of the message type Req./Resp. may be set to, for example, '000Ah.' According to some implementations, the nonce may be generated by the host device 100.

Referring to FIG. 28B, a response UPIU may be transmitted from the storage device 200 to the host device 100 in the advanced RPMB mode. The response UPIU of FIG. 28B may correspond to the bitmap read response of FIG. 24. A message data frame for the bitmap read response in the advanced RPMB mode may be the same as a message data frame for the bitmap read request in the advance RPMB mode. A value of the message type Req./Resp. may be set to, for example, '0A00h.'

The bitmap may include information on bitmap index values managed by the storage device 200. According to some implementations, the response UPIU may include a value for the write counter. According to some implementations, the message authentication code MAC may be generated in the storage device 200 and transmitted to the host device 100. In this case, the host device 100 may perform a verify operation on the bitmap read response based on the message authentication code MAC.

As described in FIGS. 25 to 28B, the storage system 10B according to some implementations may support a bitmap read request and a bitmap read response, and may operate in both the normal RPMB mode and the advanced RPMB mode. The host device 100 may recognize a current state of bitmap indexes managed in the bitmap index storage area 211 through a bitmap index read request and a bitmap read response. Accordingly, the host device 100 may check whether a request or response has been stolen by an attacker.

In FIGS. 10 to 25, the storage system 10B according to some implementations has been described as using a UFS interface. However, this is merely exemplary, and some implementations are not limited thereto. For example, some implementations may be applied to an NVMe interface, a PCIe interface, or the like. Hereinafter, as other implementations, examples applied to the NVMe interface will be additionally described.

Figure 29:
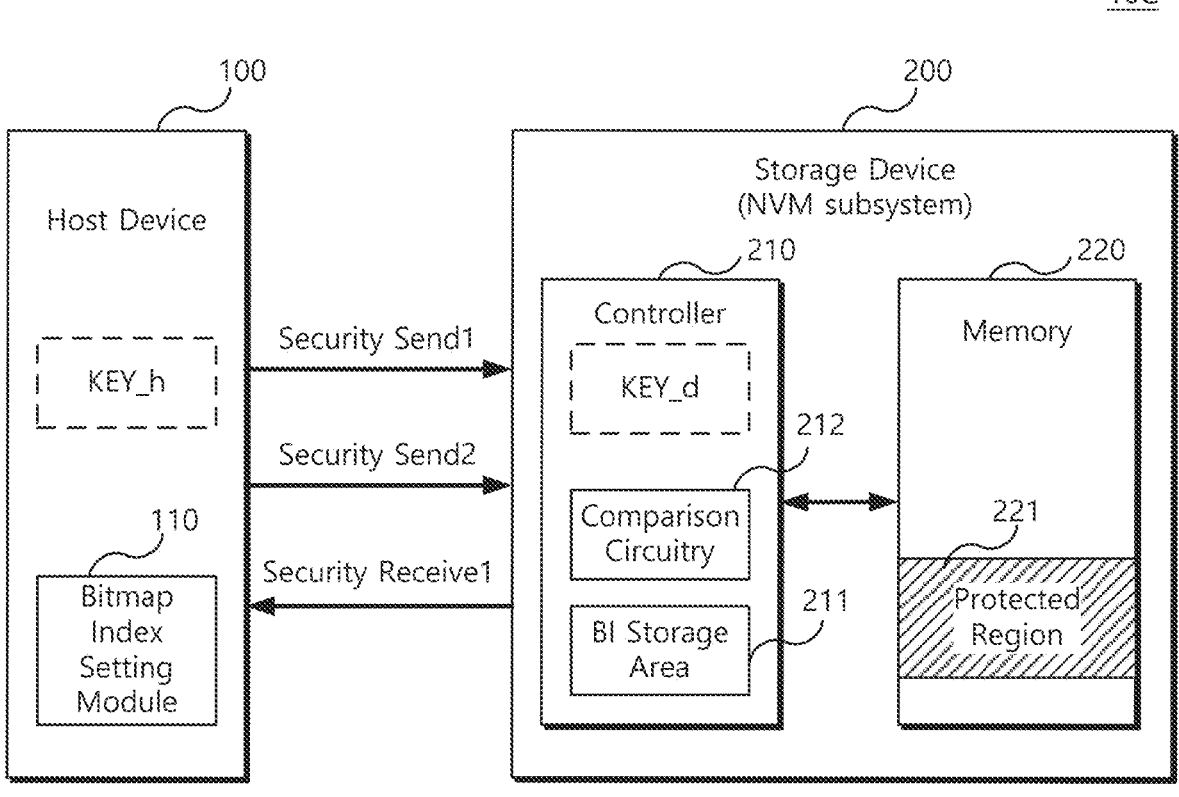
FIG. 29 is a block diagram illustrating a storage system according to some implementations.

FIG. 29 is a block diagram illustrating a storage system 10C according to some implementations. The storage system 10C of FIG. 29 is similar to the storage system 10B of FIG. 10. Therefore, the same or similar components are denoted by the same or similar reference numerals, and redundant descriptions will be omitted below.

Referring to FIG. 29, the storage system 10C may include a host device 100 and a storage device 200. The storage device 200 may be referred to as an NVM subsystem.

As compared with the storage system 10B of FIG. 10, the storage system 10C of FIG. 29 may perform a communication operation between the host device 100 and the storage device 200 using an NVMe interface. For example, the host device 100 may transmit a first security send command Security Send1 and a second security send command Security Send2 to the storage device 200, and the second storage device 200 may transmit a first security receive command Security Receive1 to the host device 100. For example, the first security send command Security Send1 may be a command requesting data to be written in a protected region 221. The second security send command Security Send2 may be a command requesting a result of a data write request. The first security receive command Security Receive1 may be a command returning a result of the data write request.

The storage system 10C according to some implementations may verify the first security send command Security Send1 using a bitmap index. Accordingly, security for the protected region 221 may be enhanced.

FIGS. 30A-30C include diagrams, respectively illustrating examples of commands when the storage system 10C of FIG. 29 performs an authenticated data write operation. In detail, FIG. 30A illustrates an example of a first security send command Security Send1, FIG. 30B illustrates an example of a second security send command Security Send2, and FIG. 30C illustrates an example of a first security receive command Security Receive1.

Commands in FIGS. 30A-30C for an authenticated data write operation in NVMe are similar to the commands in FIGS. 12A-12B and 16A-16B for an authenticated data write operation in a UFS. Therefore, redundant descriptions will be omitted below.

Referring to FIG. 30A, when an authenticated data write operation is performed, an RPMB data frame of the first security send command Security Send1 issued by the host device 100 may include bitmap support, a bitmap index, a message authentication code MAC, data, an RPMB target, a nonce, a write counter, an address, a sector count, a result, and a message type Request/Response.

The first security send command Security Send1 may be a command requesting data to be written in the protected region 221. In this case, the message type Request/Response may be set to, for example, '0003h.' The nonce may be, for example, '0 . . . 00h.' The bitmap support may be set using a bitmap index flag, and the bitmap index may be set by the host device 100.

Referring to FIG. 30B, when an authenticated data write operation is performed, an RPMB data frame of the second security send command Security Send2 issued by the host device 100 may be the same as that of the first security send command Security Send1.

The second security send command Security Send2 may be a command requesting a result of the first security send command Security Send1, for example, a result of the data write request. In this case, the message type Request/Response may be set to, for example, '0005h.'

Referring to FIG. 30C, when an authenticated data write operation is performed, an RPMB data frame of the first security receive command Security Receive1 issued by the storage device 200 may be the same as the first and second security send commands Security Send1 and Security 2.

The first security receive command Security Receive1 may be a command returning the result of the data write request. In this case, the message type Request/Response may be set to, for example, '0300h.' The result may be set to a value corresponding to a result code. For example, when the write counter is expired or an error is present in an address, the result codes may be set to '0005h' and '0004h,' respectively. The nonce may be set to, for example, '0 . . . 00h.' When the data write request is successfully processed, the write counter may have a value increased by '1.'

FIGS. 31A-31C include diagrams, respectively illustrating examples of commands when the storage system 10C of FIG. 29 performs an authenticated device configuration block write operation, according to some implementations.

In detail, FIG. 31A illustrates an example of a first security send command Security Send1, FIG. 31B illustrates an example of a second security send command Security Send2, and FIG. 31C illustrates an example of a first security receive command Security Receive1.

Commands of FIGS. 31A-31C for an authenticated device configuration block write operation in an NVMe are similar to the commands of FIGS. 13A-13B and 17A-17B for a security write protect configuration block write request in a UFS. Therefore, redundant descriptions will be omitted below.

Referring to FIG. 31A, when an authenticated device configuration block write operation is performed, an RPMB data frame of the first security send command Security Send1 issued by the host device 100 may include bitmap support, a bit bitmap index, a message authentication code MAC, data, an RPMB target, a nonce, a write counter, an address, a sector count, a result, and a message type Request/Response.

The first security send command Security Send1 may be a command requesting writing or updating data on the RPMB device configuration block. In this case, the message type Request/Response may be set to, for example, '0006h.' The data may be associated with an RPMB device configuration block data structure. The nonce may be set to, for example, '0 . . . 00h.' The RPMB target may be set to, for example, '00h.'

In some implementations, the bitmap support may be set using a bitmap index flag, and the bitmap index may be set by the host device 100. Accordingly, the bitmap index authentication scheme according to some implementations may be supported.

Referring to FIG. 31B, when an authenticated device configuration block write operation is performed, an RPMB data frame of the second security send command Security Send2 issued by the host device 100 may be the same as the first security send command Security Send1.

The second security send command Security Send2 may be a command requesting a result of the first security send command Security Send1. In this case, the message type Request/Response may be set to, for example, '0005h.'

Referring to FIG. 31C, when an authenticated device configuration block write operation is performed, an RPMB data frame of the first security receive command Security Receive1 issued by the storage device 200 may be the same as the first and second security send commands Security Send1 and Security Send2.

The first security receive command Security Receive1 may be a command returning a result of writing or updating data on an RPMB device configuration block. In this case, the message type Request/Response may be set to, for example, '0600h.' Also, the result may be set to a value corresponding to a result code. When a data write request is successfully processed, the write counter may have a value increased by '1.'

As described with reference to FIGS. 29 to 31C, the storage system 10C according to some implementations may support an NVMe interface and may perform an authenticated data write operation and an authenticated device configuration block write operation. In this case, the storage system 10C according to some implementations may indicate whether the bitmap authentication scheme according to some implementations is supported, through the bitmap support and may additionally verify a request REQ, issued by the host device 100, through the bitmap index. Accordingly, security for the protected region 221 (see FIG. 29) may be enhanced.

FIG. 32 is a diagram illustrating an example of a method for the storage system 10C of FIG. 29 to verify the first security send command Security Send1, according to some implementations.

For ease of description, in FIG. 32, an example is provided where the first security send command Security Send1 includes a message authentication code MAC_hk, data D, a write counter WC_hk, and a bitmap index Bk.

Referring to FIG. 32, in operation S711, the host device 100 may provide a write counter read request REQ_wc to the storage device 200.

In S712, the storage device 200 may provide a write counter read response RES_wc to the host device 100. The host device 100 may set the host write counter WC_hk to the device write counter WC_dk included in the write counter read response RES_wc.

In operation S713, the host device 100 may generate a bitmap index Bk.

In operation S714, the host device 100 may generate a host message authentication code MAC_hk based on the data D, a host key KEY_h, and the host write counter WC_hk.

In operation S715, the host device 100 may issue a first security send command Security Send1. The first security send command Security Send1 may include the host message authentication code MAC_hk, the data D, the host write counter WC_hk, and the bitmap index Bk.

In operation S716, the storage device 200 may receive and verify the first security send command Security Send1. For example, the storage device 200 may verify the first security send command Security Send1 based on a currently received bitmap index Bk and bitmap indexes stored in the bitmap index storage area 211. In addition, the storage device 200 may additionally verify the first security send command Security Send1 based on at least one of the host message authentication code MAC_hk and the host write counter WC_hk.

In operation S717, the host device 100 may issue a second security send command Security Send2.

In operation S718, the storage device 200 may update the device write counter WC_dk. For example, the storage device 200 may update the device write counter WC_dk based on a result of verifying the first security send command Security Send1. Accordingly, the device write counter WC_dk may be maintained or changed.

In operation S719, the storage device 200 may generate a device message authentication code MAC_dk. For example, the storage device 200 may generate the device message authentication code MAC_dk based on the device write counter WC_dk and a device key KEY_d.

In operation S720, the storage device 200 may issue a first security receive command Security Receive1. The first secure receive command Security Receive1 may include a device message authentication code MAC_dk and a result of success or failure for the first secure send command Security Send1.

Figure 33:
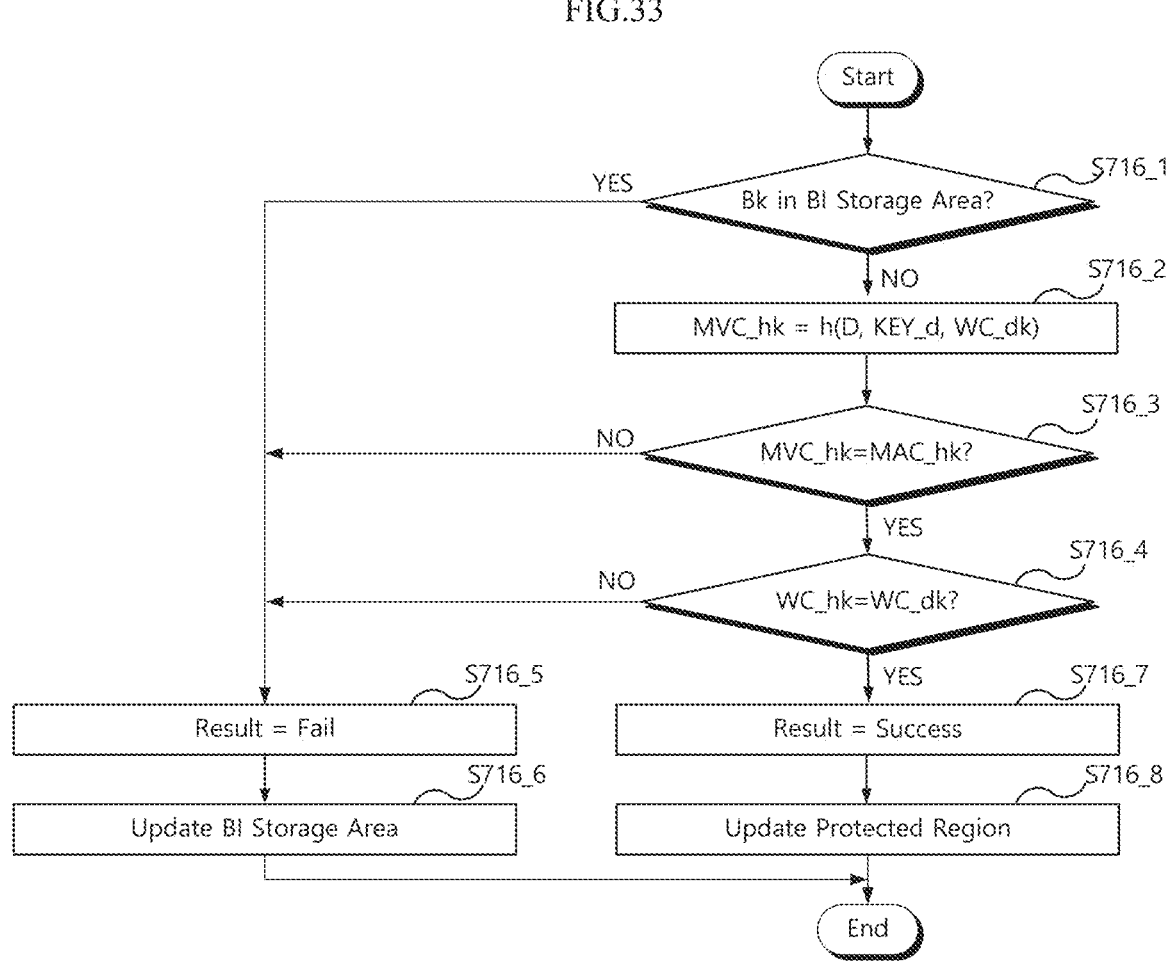
FIG. 33 is a flowchart illustrating an example of operation S716 of FIG. 32 in more detail, according to some implementations.

FIG. 33 is a flowchart illustrating an example of operation S716 of FIG. 32 in more detail.

In operation S716_1, a check may be made as to whether a currently received bitmap index Bk is the same as one of previously received bitmap indexes, according to some implementations.

When the same bitmap index is present, the flow may proceed to operation S716_5 in which the currently received first security send command Security Send1 is processed as a failure. When the same bitmap index is absent, the flow may proceed to operation S716_2 in which additional authentication is performed.

In operation S716_2, a message verification code MVC_hk may be generated. For example, the storage device 200 may extract data Dk from the first security send command Security Send1, and may calculate the message verification code MVC_hk using the device key KEY_d and a device write counter WC_dk stored in the storage device 200.

In operation S716_3, a determination may be made as to whether the calculated message verification code MVC_hk matches the host message verification code MAC_hk included in the first security send command Security Send1.

When the message verification code MVC_hk and the host message verification code MAC_hk do not match each other, the flow may proceed to operation S716_5 in which the first security send command Security Send1 is processed as a failure. When the message verification code MVC_hk and the host message verification code MAC_hk match each other, the flow may proceed to operation S716_4 in which additional authentication is performed.

In operation S716_4, a determination may be made as to whether the host write counter WC_hk is the same as the device write counter WC_dk. For example, the storage device 200 may extract the host write counter WC_hk from the first security send command Security Send1 and may compare the extracted host write counter WC_hk with the device write counter WC_dk stored in the register 214 (see FIG. 29).

When the host write counter WC_hk and the device write counter WC_dk do not match each other, the flow may proceed to operation S716_5 in which the first security send command Security Send1 is processed as a failure. When the host write counter WC_hk and the device write counter WC_dk match each other, the flow may proceed to operation S716_7 in which the first security send command Security Send1 is successfully processed.

In operation S716_5, the first security send command Security Send1 may be processed as a failure. In this case, in operation S716_6, bitmap indexes stored in the bitmap index storage area 211 may be updated.

In operation S716_7, the first security send command Security Send1 may be successfully processed. In this case, in operation S716_8, the data D included in a currently received request REQk may be written in the protected region 221 (see FIG. 29).

Figure 34:
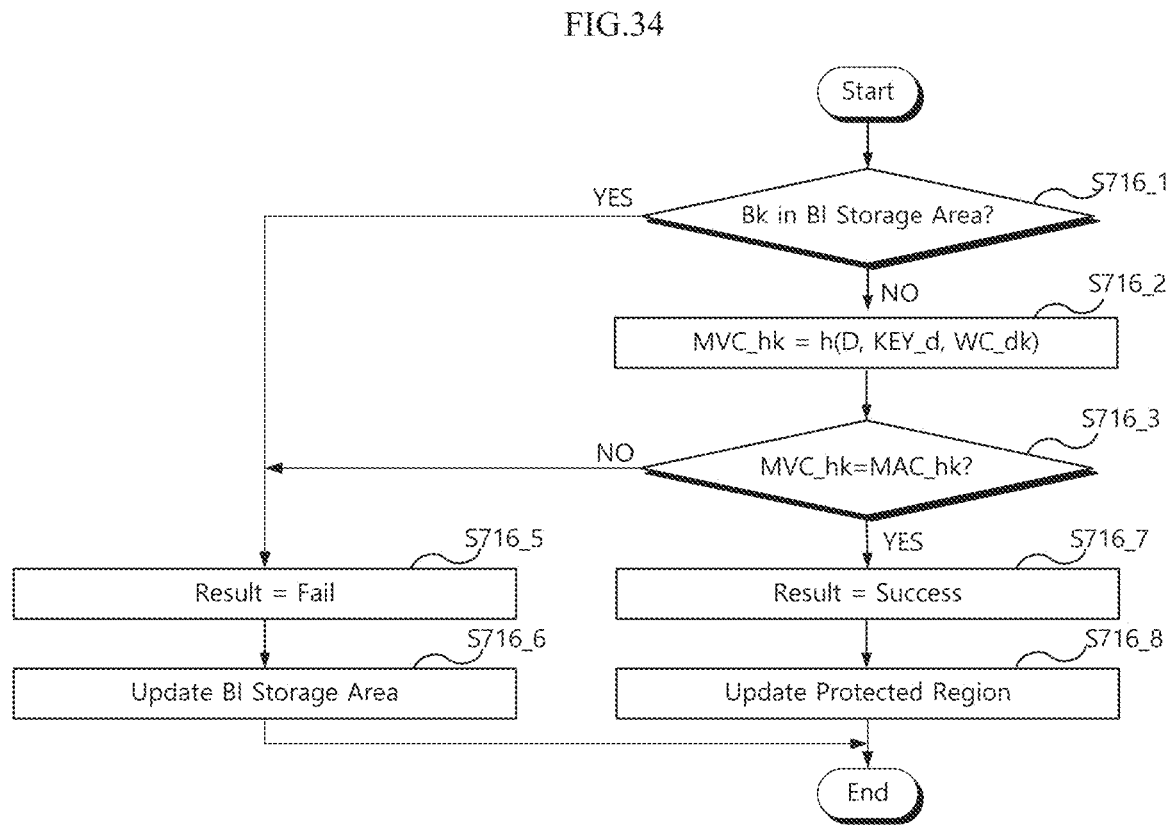
FIG. 34 is a flowchart illustrating another example of operation S716 of FIG. 32 in more detail, according to some implementations.

FIG. 34 is a flowchart illustrating another example of operation S716 of FIG. 32 in more detail, according to some implementations. The operation method of FIG. 34 is similar to the operation method of FIG. 33. Therefore, redundant descriptions will be omitted below.

Unlike the description in FIG. 33, in FIG. 34, performing an additional verify operation using a write counter may be omitted.

A more detailed description will be provided with reference to FIG. 34. In operation S716_1, a check may be made as to whether a currently received bitmap index Bk is the same as one of previously received bitmap indexes. When the same bitmap index is present, the flow may proceed to operation S716_5 in which the currently received first security send command Security Send1 is processed as a failure.

In operation S716_2, a message verification code MVC_hk may be generated. In operation S716_3, a determination may be made as to whether the calculated message verification code MVC_hk matches a host message verification code MAC_hk included in the first security send command Security Send1.

When the message verification code MVC_hk and the host message verification code MAC_hk do not match each other, the flow may proceed to operation S716_5 in which the first security send command Security Send1 is processed as a failure. When the message verification code MVC_hk and the host message verification code MAC_hk match each other, the flow may proceed to operation S716_7 in which the first security send command Security Send1 is successfully processed.

As described above, the storage system 10C according to some implementations may manage history information on a security send request, transmitted from the host device 100 to the storage device 200, using a bitmap index even in an environment using an NVMe interface, and may verify the history information. Accordingly, security for the protected region 221 may be further enhanced.

FIGS. 35A and 35B are diagrams, respectively illustrating an example of a bitmap read request of the storage system 10C according to some implementations and an example of a bitmap read response thereto, according to some implementations. In detail, FIG. 35A illustrates an example of a bitmap read request under an environment using an NVMe interface, and FIG. 35B illustrates an example of a bitmap read response. The bitmap read request and the bitmap response request in FIGS. 35A and 35B are similar to those in FIGS. 27A and 27B. Therefore, redundant descriptions will be omitted below.

Referring to FIGS. 35A and 35B, message data frames for the bitmap read request and the bitmap read response include a size of bitmap, a bitmap, a message authentication code MAC, data, a nonce, a write counter, an address, a block count, a result, and a message type Req./Resp.

In some implementations, a host device 100 may transmit a bitmap read request Get Bitmap Info Request to a storage device 200 under the environment using the NVMe interface. The storage device 200 may provide bitmap index information to the host device 100 through a bitmap read response Read Result Response in response the bitmap read request. Accordingly, the host device 100 may recognize not only a current state of bitmap indexes managed in the bitmap index storage area 211 (see FIG. 29) but also a maximum storable size.

As set forth above, a data write method according to some implementations may effectively detect a replay attack reusing a previously used request. Accordingly, security for a protected region may be further enhanced.

It will be appreciated that the above descriptions are merely exemplary, and some implementations may be variously modified and applied. For example, it will be readily appreciated that field values included in each of the above-described requests and/or responses may vary according to some implementations. In addition, it will be appreciated that according to some implementations, other than a verification scheme using a message authentication code MAC, various authentication or verification schemes may be applied, and such schemes are all considered to fall within the scope of the present disclosure. In addition, it will be appreciated that the order of a plurality of verify operations of verifying received request may vary according to some implementations. For example, as described in FIGS. 19 and 23, the order of verify operations using a nonce, a bitmap index, a message authentication code, and/or a write counter may be variously adjusted according to some implementations, and it will be appreciated such orders are all considered to fall within the scope of the present disclosure.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

What is claimed is:

1. A method comprising:
receiving, by a storage device from a host device, a write request, the write request comprising a first message authentication code, data, and a bitmap index;
verifying, by the storage device, the write request based on the first message authentication code and the bitmap index, wherein verifying the write request comprises:
calculating, by the storage device, a second message authentication code based on the data and the bitmap index received from the host device;
comparing, by the storage device, the second message authentication code calculated in the storage device with the first message authentication code of the write request; and
comparing, by the storage device, the bitmap index of the write request with a plurality of bitmap indexes stored in the storage device to determine whether a replay attack has been made; and
after the write request is verified, writing, by the storage device, the data in a replay protected memory block (RPMB) area of the storage device.

2. The method of claim 1, wherein
verifying the write request further comprises:
processing the write request as a failure when the bitmap index of the write request and one bitmap index of the plurality of bitmap indexes stored in the storage device match each other.

3. The method of claim 1, wherein
verifying the write request further comprises:
processing the write request as a failure when the first message authentication code of the write request and the second message authentication code calculated in the storage device do not match each other.

4. The method of claim 3, wherein
verifying the write request further comprises:
storing the bitmap index of the write request in the storage device when the first message authentication code of the write request and the second message authentication code calculated in the storage device do not match each other.

5. The method of claim 1, wherein
the write request further comprises a host write counter, and
verifying the write request further comprises:
comparing the host write counter of the write request with a device write counter stored in the storage device.

6. The method of claim 5, wherein
verifying the write request further comprises:
    processing the write request as a failure when the host write counter of the write request and the device write counter of the storage device do not match each other.

7. The method of claim 1, wherein
the write request further comprises a first nonce, and
verifying the write request further comprises comparing the first nonce of the write request with a second nonce stored in the storage device.

8. The method of claim 7, wherein
verifying the write request further comprises processing the write request as a failure when the first nonce of the write request and the second nonce stored in the storage device do not match each other.

9. The method of claim 8, wherein
verifying the write request further comprising storing the second nonce of the write request into the storage device when the second nonce of the write request and the first nonce stored in the storage device match each other.

10. The method of claim 1, wherein
the write request further comprises bitmap support, and
the bitmap support indicates whether a function of verifying the write request based on the bitmap index is supported.

11. The method of claim 10, wherein
the write request is an authenticated data write request in a normal RPMB mode, and
the authenticated data write request in the normal RPMB mode comprises the bitmap index and the bitmap support.

12. The method of claim 10, wherein
the write request is an authenticated secure write protect configuration block write request in a normal RPMB mode, and
the authenticated secure write protect configuration block write request in the normal RPMB mode comprises the bitmap index and the bitmap support.

13. The method of claim 10, wherein
the write request is a command universal flash storage (UFS) protocol information unit (UPIU) corresponding to an authenticated data write operation in an advanced RPMB mode,
an extra head segment (EHS) field of the command UPIU comprises the bitmap index and the bitmap support, and
a total EHS length of the command UPIU is 03h.

14. The method of claim 10, wherein
the write request is a command universal flash storage (UFS) protocol information unit (UPIU) corresponding to an authenticated secure write protect configuration block write operation in an advanced RPMB mode,
an extra head segment (EHS) field of the command UPIU comprises the bitmap index and the bitmap support, and
a total EHS length of the command UPIU is 03h.

15. The method of claim 1, further comprising:
receiving, from the host device, a bitmap read request for information of bitmap indexes managed in the storage device; and
transmitting the information of the bitmap indexes to the host device.

16. The method of claim 15, wherein
the bitmap read request is a request in a normal RPMB mode, and a bitmap read request in the normal RPMB mode comprises a size of a bitmap and a read request for a bitmap index.

17. The method of claim 15, wherein
the bitmap read request is a command universal flash storage (UFS) protocol information unit (UPIU) in an advanced RPMB mode,
an extra head segment (EHS) field of the command UPIU comprises a size of the bitmap and a bitmap index, and
a total EHS length of the command UPIU is 03h.

18. A method comprising:
receiving, by a storage device, a write counter read request from a host device;
transmitting, by the storage device, a write counter, stored in the storage device, to the host device;
receiving, by the storage device, a write request comprising a message authentication code, data, a write counter, a bitmap index, and a nonce, from the host device;
verifying, by the storage device, the write request based on the message authentication code and the bitmap index, wherein verifying the write request comprises:
    comparing, by the storage device, the nonce of the write request with a nonce stored in the storage device;
    calculating, by the storage device, a message authentication code based on the data and the bitmap index received from the host device;
    comparing, by the storage device, the message authentication code, calculated in the storage device with the message authentication code of the write request;
    comparing, by the storage device, the bitmap index of the write request with a plurality of bitmap indexes stored in the storage device; and
    comparing, by the storage device, the write counter of the write request with a write counter stored in the storage device; and
after the write request is verified, writing, by the storage device, the data in a replay protected memory block (RPMB) area of the storage device.

19. The method of claim 18, further comprising:
increasing the write counter by 1 when the write request is determined to be successful.

20. A storage device sharing a key with a host device, the storage device comprising:
a memory comprising a replay protected memory block (RPMB) area; and
a controller configured to verify a write request for the RPMB area received from the host device, the write request comprising a first message authentication code, data, and a bitmap index,
wherein the controller comprises:
    a bitmap index storage area storing a plurality of bitmap indexes received from the host device; and
    a comparison circuit configured to compare the bitmap index of the write request with the plurality of bitmap indexes stored in the bitmap index storage area to determine whether a replay attack has been made, and
wherein the controller is configured to
    calculate a second message authentication code based on the data and the bitmap index received from the host device,
    compare the second message authentication code with the first message authentication code of the write request, and after the write request is verified, write the data in the RPMB area.

* * * * *